United States Patent
Katsuta

(10) Patent No.: US 10,810,984 B2
(45) Date of Patent: Oct. 20, 2020

(54) FINGERING DISPLAY DEVICE AND FINGERING DISPLAY PROGRAM

(71) Applicant: KAWAI MUSICAL INSTRUMENTS MANUFACTURING CO., LTD., Shizuoka (JP)

(72) Inventor: Masanori Katsuta, Shizuoka (JP)

(73) Assignee: KAWAI MUSICAL INSTRUMENTS MANUFACTURING CO., LTD., Shizuoka (JP)

( * ) Notice: Subject to any disclaimer, the term of this patent is extended or adjusted under 35 U.S.C. 154(b) by 0 days.

(21) Appl. No.: 16/361,619

(22) Filed: Mar. 22, 2019

(65) Prior Publication Data
US 2019/0304424 A1 Oct. 3, 2019

(30) Foreign Application Priority Data

Mar. 29, 2018 (JP) .................. 2018-064506
Mar. 30, 2018 (JP) .................. 2018-066413
Mar. 30, 2018 (JP) .................. 2018-068730
Mar. 30, 2018 (JP) .................. 2018-068787

(51) Int. Cl.
G10H 1/34 (2006.01)
G10H 1/00 (2006.01)
G09B 15/00 (2006.01)

(52) U.S. Cl.
CPC .......... *G10H 1/344* (2013.01); *G09B 15/003* (2013.01); *G10H 1/0016* (2013.01)

(58) Field of Classification Search
CPC .................. G10H 1/344; G09B 15/00
See application file for complete search history.

(56) References Cited

U.S. PATENT DOCUMENTS

| 8,338,684 B2* | 12/2012 | Pillhofer | G09B 15/00 84/470 R |
| 8,766,077 B2* | 7/2014 | Soejima | G09B 5/00 84/470 R |
| 8,895,829 B2* | 11/2014 | Soejima | G10H 1/00 84/467 |

(Continued)

FOREIGN PATENT DOCUMENTS

| JP | P3521838 B2 | 2/2004 |
| JP | P4070100 B2 | 1/2008 |

*Primary Examiner* — Robert W Horn
(74) *Attorney, Agent, or Firm* — Westman, Champlin & Koehler, P.A.

(57) ABSTRACT

A fingering display device and a fingering display program capable of drawing a fingering moving image close to actual keyboard operations by minimizing the moving distance of the back of a hand is provided. A fingering display program to perform fingering display on a screen by drawing a fingering moving image of playing a musical instrument in a musical piece reproduction based on playing information including respective musical sounds of a musical piece and corresponding finger numbers, wherein when generating a fingering drawing based on fingering position information corresponding to a reproduction time in the musical piece reproduction, the fingering display program makes a computer execute: generating the fingering position information based on single key pressing information, and synthetic key pressing information obtained by synthesizing respective key pressing information at a plurality of different times.

27 Claims, 22 Drawing Sheets

(56) References Cited

U.S. PATENT DOCUMENTS

2013/0104724 A1\* 5/2013 Soejima ................... G10H 1/00
 84/467
2013/0199357 A1\* 8/2013 Soejima ................ G09B 15/00
 84/467
2019/0304424 A1\* 10/2019 Katsuta ................ G10H 1/0016

\* cited by examiner

Fig.8

"FOR ELISE" EXAMPLE OF LEFT HAND

| STATE | | DELTA TIME | KEY PRESS-ING INFO. | NOTE NUMBER | | | | | SPECIAL FINGERING INFORMATION | | | FINGERING IMAGE |
|---|---|---|---|---|---|---|---|---|---|---|---|---|
| | | | | LITTLE | RING | MIDDLE | INDEX | THUMB | CHANGE | CROSSING UNDER | CROSSING OVER | |
| A | START POINT | 0 | FK1 | | | | | | | | | 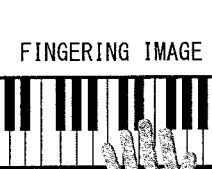 |
| | CURRENT | 0 | | | | | | | | | | |
| | END POINT | 0 | FK1 | | | | | | | | | |
| B | START POINT | 96 | FK1 | | | | | | | | |  |
| | CURRENT | 144 | | | | | | | | | | |
| | END POINT | 192 | FK24 | 45 | | | 52 | | | | | |
| C | START POINT | 192 | FK24 | 45 | | | 52 | | | | |  |
| | CURRENT | 192 | | | | | | | | | | |
| | END POINT | 192 | FK24 | 45 | | | 52 | | | | | |
| D | START POINT | 202 | FK12 | 45 | | | 52 | | | | |  |
| | CURRENT | 210 | | | | | | | | | | |
| | END POINT | 216 | FK24 | | | | 52 | 57 | | | | |
| E | START POINT | 216 | FK24 | | | | 52 | 57 | | | |  |
| | CURRENT | 216 | | | | | | | | | | |
| | END POINT | 216 | FK24 | | | | 52 | 57 | | | | |
| F | START POINT | 226 | FK12 | | | | 52 | 57 | | | |  |
| | CURRENT | 234 | | | | | | | | | | |
| | END POINT | 240 | FK2 | | | | | 57 | | | | |
| G | START POINT | 240 | FK2 | | | | | 57 | | | |  |
| | CURRENT | 240 | | | | | | | | | | |
| | END POINT | 240 | FK2 | | | | | 57 | | | | |
| H | START POINT | 263 | FK1 | | | | | 57 | | | |  |
| | CURRENT | 288 | | | | | | | | | | |
| | END POINT | 336 | FK24 | 40 | | | | 52 | | | | |
| I | START POINT | 336 | FK24 | 40 | | | | 52 | | | |  |
| | CURRENT | 336 | | | | | | | | | | |
| | END POINT | 336 | FK24 | 40 | | | | 52 | | | | |
| J | START POINT | 346 | FK12 | 40 | | | | 52 | | | |  |
| | CURRENT | 354 | | | | | | | | | | |
| | END POINT | 360 | FK24 | | | | | 52 | | | | |

Fig.9

"FOR ELISE" EXAMPLE OF LEFT HAND

| STATE | DELTA TIME | | KEY PRESS-ING INFO. | NOTE NUMBER | | | | | SPECIAL FINGERING INFORMATION | | | FINGERING IMAGE |
|---|---|---|---|---|---|---|---|---|---|---|---|---|
| | | | | LITTLE | RING | MIDDLE | INDEX | THUMB | CHANGE | CROSSING UNDER | CROSSING OVER | |
| K | START POINT | 360 | FK24 | | | | | 52 | | | |  |
| | CURRENT | 360 | | | | | | | | | | |
| | END POINT | 360 | FK24 | | | | | 52 | | | | |
| L | START POINT | 370 | FK12 | | | | | 52 | | | |  |
| | CURRENT | 378 | | | | | | | | | ○ | |
| | END POINT | 384 | FK2 | | | | 56 | | | | | FINGER CROSSING OVER |
| M | START POINT | 384 | FK2 | | | | 56 | | | | |  |
| | CURRENT | 384 | | | | | | | | | ○ | |
| | END POINT | 384 | FK2 | | | | 56 | | | | | FINGER CROSSING OVER |
| N | START POINT | 407 | FK1 | | | | 56 | | | | |  |
| | CURRENT | 432 | | | | | | | | | | |
| | END POINT | 480 | FK24 | 45 | | | 52 | | | | | |
| O | START POINT | 480 | FK24 | 45 | | | 52 | | | | |  |
| | CURRENT | 480 | | | | | | | | | | |
| | END POINT | 480 | FK24 | 45 | | | 52 | | | | | |
| P | START POINT | 490 | FK12 | 45 | | | 52 | | | | |  |
| | CURRENT | 498 | | | | | | | | | | |
| | END POINT | 504 | FK24 | | | | 52 | 57 | | | | |
| Q | START POINT | 504 | FK24 | | | | 52 | 57 | | | |  |
| | CURRENT | 504 | | | | | | | | | | |
| | END POINT | 504 | FK24 | | | | 52 | 57 | | | | |
| R | START POINT | 514 | FK12 | | | | 52 | 57 | | | |  |
| | CURRENT | 522 | | | | | | | | | | |
| | END POINT | 528 | FK2 | | | | | 57 | | | | |
| S | START POINT | 528 | FK2 | | | | | 57 | | | |  |
| | CURRENT | 528 | | | | | | | | | | |
| | END POINT | 528 | FK2 | | | | | 57 | | | | |
| T | START POINT | 551 | FK1 | | | | | 57 | | | | 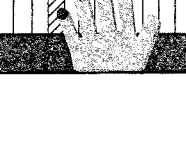 |
| | CURRENT | 588 | | | | | | | | | | |
| | END POINT | 647 | FK24 | 45 | | | 52 | | | | | |
| U | START POINT | 768 | FK24 | 45 | | | 52 | | | | |  |
| | CURRENT | 768 | | | | | | | | | | |
| | END POINT | 768 | FK24 | 45 | | | 52 | | | | | |

Fig.26A

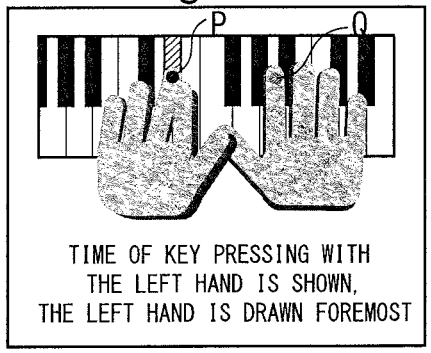

TIME OF KEY PRESSING WITH
THE LEFT HAND IS SHOWN,
THE LEFT HAND IS DRAWN FOREMOST

Fig.26B

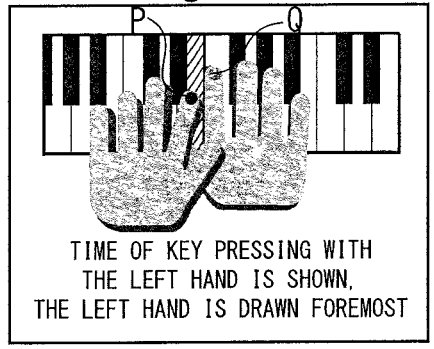

TIME OF KEY PRESSING WITH
THE LEFT HAND IS SHOWN,
THE LEFT HAND IS DRAWN FOREMOST

Fig.26C

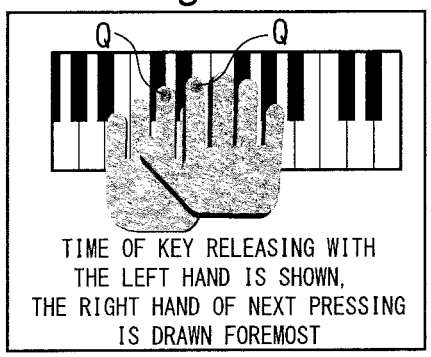

TIME OF KEY RELEASING WITH
THE LEFT HAND IS SHOWN,
THE RIGHT HAND OF NEXT PRESSING
IS DRAWN FOREMOST

Fig.26D

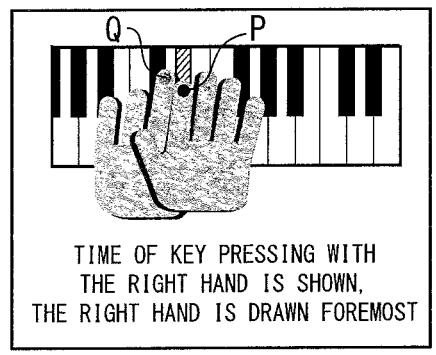

TIME OF KEY PRESSING WITH
THE RIGHT HAND IS SHOWN,
THE RIGHT HAND IS DRAWN FOREMOST

Fig.26E

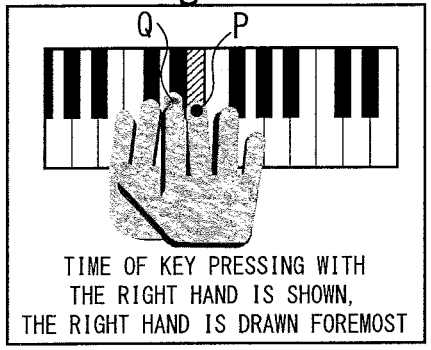

TIME OF KEY PRESSING WITH
THE RIGHT HAND IS SHOWN,
THE RIGHT HAND IS DRAWN FOREMOST

Fig.26F

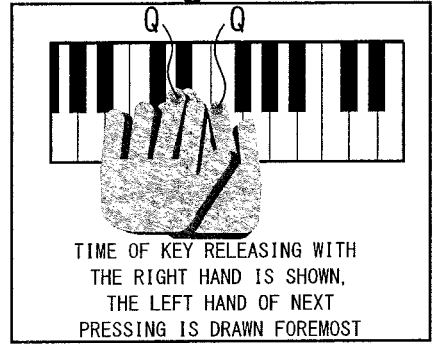

TIME OF KEY RELEASING WITH
THE RIGHT HAND IS SHOWN,
THE LEFT HAND OF NEXT
PRESSING IS DRAWN FOREMOST

Fig.26G

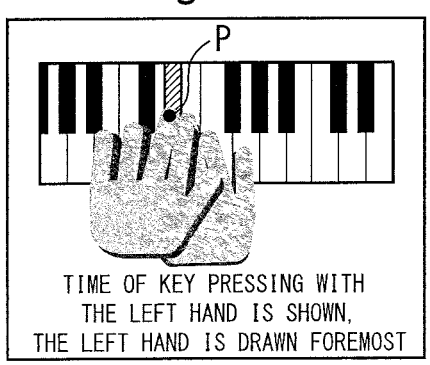

TIME OF KEY PRESSING WITH
THE LEFT HAND IS SHOWN,
THE LEFT HAND IS DRAWN FOREMOST

Fig.26H

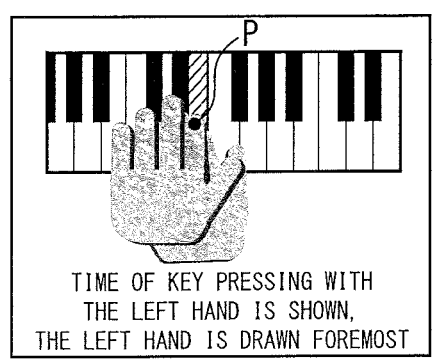

TIME OF KEY PRESSING WITH
THE LEFT HAND IS SHOWN,
THE LEFT HAND IS DRAWN FOREMOST

MUSICAL SCORE THAT LEFT HAND AND RIGHT HAND ARE PRESSED SIMULTANEOUSLY

T11  T12  T13  T14  T15

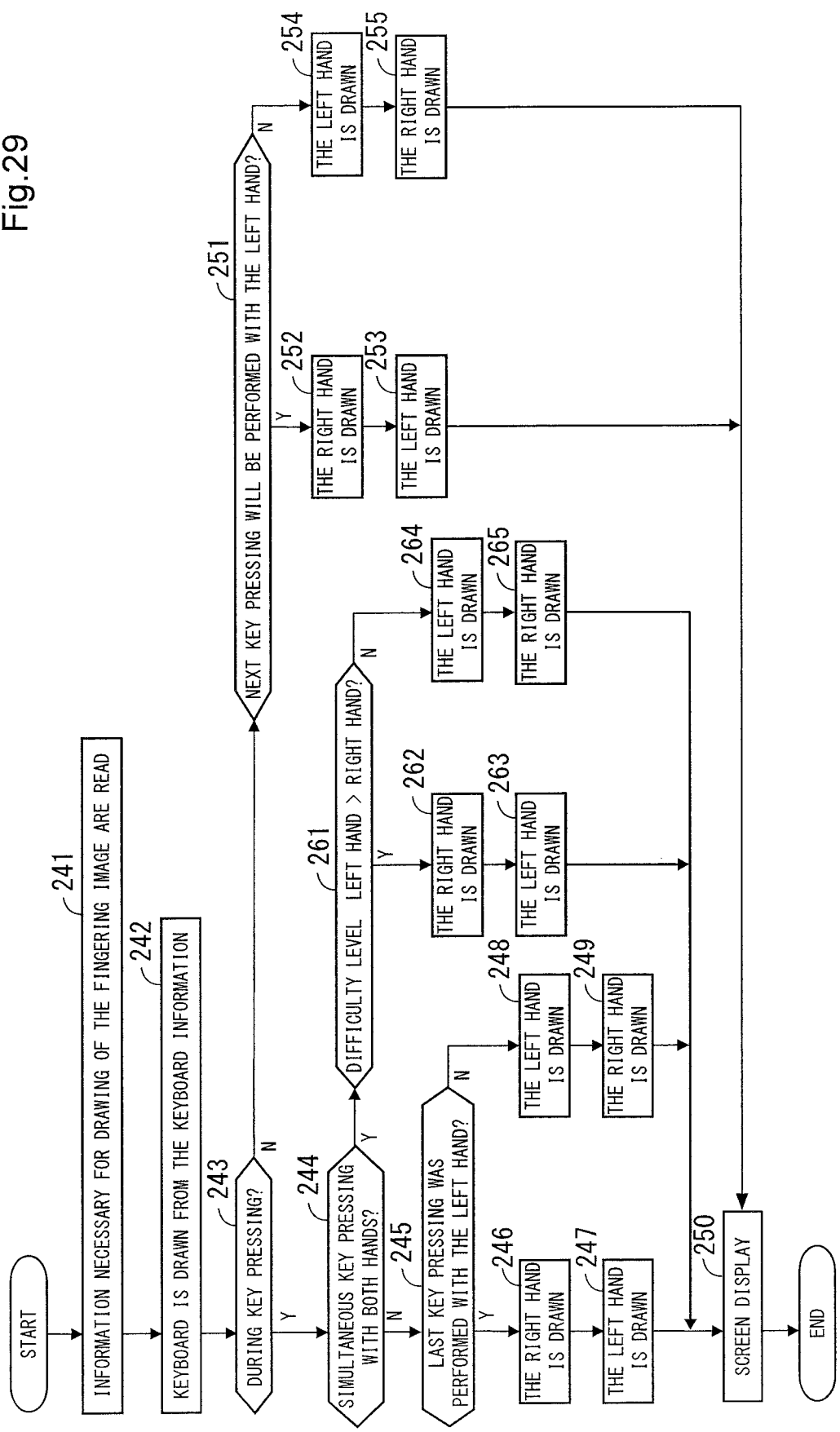

FINGERING DISPLAY DEVICE AND FINGERING DISPLAY PROGRAM

CROSS-REFERENCE TO RELATED APPLICATIONS

This non-provisional application claims priority to Japanese Patent Application Nos. 2018-064506, filed on Mar. 29, 2018; 2018-066413, filed on Mar. 30, 2018; 2018-068787, filed on Mar. 30, 2018; and 2018-068730, filed on Mar. 30, 2018, the contents of which are hereby incorporated by reference in their entireties.

TECHNICAL FIELD

The present invention relates to a fingering display for practicing playing a keyboard instrument, and to a fingering display device that, based on playing information consisting of a plurality of musical sounds and finger number information corresponding to the respective musical sounds, draws a fingering moving image of playing a musical instrument and displays the fingering moving image on a screen in musical sound reproduction, and a fingering display program for the fingering display device.

BACKGROUND ART

There has been proposed a playing action display device that instructs a practicing person on fingering for key pressing and key releasing by displaying a fingering image consisting of the back of a hand and the thumb and fingers so as to be superimposed on display of a keyboard to be operated when practicing playing a keyboard instrument such as an electronic piano.

For example, Patent Literature 1 discloses a fingering moving image generating technology in which hand movement continuously shifts for easy understanding of fingering, and conditions are divided between the case of a single note and the case of a chord, and a finger arrangement and a position of the back of a hand in each case are determined.

That is, Patent Literature 1 describes a fingering display device in which a plurality of kinds of operation fingering image data and a plurality of kinds of process fingering image data are stored in a ROM in advance, operation fingering image data corresponding to fingering showing a start of an operation of a key for note-on processing is selected and readout from the ROM and is supplied to and displayed by a display device, and further, process fingering image data corresponding to fingering showing a process until reaching the start of operation of a key to be pressed next to note-off processing is selected and readout from the ROM and is supplied to and displayed by the display device, and which thereby provides detailed playing guidance according to the progression of a musical piece.

In addition, the applicant proposed a method disclosed in Patent Literature 2 as a fingering display method capable of drawing a hand position matching a keyboard size and the size of a keyboard on a screen display.

CITATION LIST

Patent Literatures

Patent Literature 1: Japanese Patent No. 3521838
Patent Literature 2: Japanese Patent No. 4070100

SUMMARY OF INVENTION

Technical Problem

However, in the method of fingering display in the fingering display device disclosed in Patent Literature 1, depending on the arrangement of music sounds in a musical piece, hand movements when operating a keyboard and a fingering moving image sometimes deviate from each other.

For example, in tremolo playing by alternately striking a key of "C" with the thumb and a one octave lower key of "C" with the little finger of the left hand, or in playing a broken chord with a left hand for accompaniment, etc., a problem occurs when playing each single note.

That is, in the conventional method in which the finger arrangement and the position of the back of a hand are determined for each single note, a hand moving distance for each key pressing becomes long, and thus an unnatural and inefficient fingering moving image is generated.

For example, when a musical score for a left hand is the one shown in FIG. 10 (the numeral displayed above each note indicates a finger to press the key. 1 denotes the thumb, and 5 denotes the little finger.), a problem occurs in which, as shown in FIG. 11, a fingering image is displayed in which the hand greatly moves to the left or right for each key pressing, which tends to cause a next key pressing operation to delay.

However, in actual playing, it is certainly much easier to play single notes by widening the fingers as in the case of chording, with as little movement of the back of the hand as possible, and skilled players also commonly play in such a way.

Not only in the above-described example (the example of alternately playing notes about one octave away from each other), but also in cases of shifting from a chord to a single note, from a single note to a chord, and from a chord to a chord, it is desirable to realize easy pressing of a key(s), easy pressing of a next key(s), and as short a moving distance of the back of a hand as possible, however, these cannot be sufficiently realized in most cases of the conventional fingering display method.

In addition, the fingering display method in the fingering display device disclosed in Patent Literature 1 has a problem in which when a time period from key releasing to the next key pressing is long to some extent, a fingering moving image showing continuous shifting from the key releasing to the next key pressing is generated, so that an unnatural moving image like a slow-motion image in which a hand with the fingers gradually widening slowly moves over a long interval is generated.

Further, according to the fingering display device disclosed in Patent Literature 1, it becomes possible to instruct a practicing person which finger strikes which key at which timing in an intuitive manner, and on the other hand, it is impossible to give instructions on a sound volume, which is an important element in playing music, in an intuitive manner by a fingering moving image.

Additionally, in the fingering display device of Patent Literature 1, when the left hand and the right hand approach or cross and both hands overlap, a phenomenon frequently occurs in which one hand hides the vicinities of the tips of fingers of the other hand that are necessary information for the other hand. In such cases, consideration was not given as to how to prioritize each hand and how to draw each hand.

The present invention was proposed in view of the above-described circumstances, and an object thereof is to provide a fingering display device and a fingering display program capable of drawing a fingering moving image close to actual keyboard operations by minimizing the moving distance of the back of a hand.

Another object of the present invention is to provide a fingering display program capable of drawing a fingering moving image close to actual keyboard operations by eliminating unnatural slow movements of a fingering moving image, when generating a fingering moving image, even when a time period from key releasing to the next key pressing is long.

Further, still another object of the present invention is to provide a fingering display device and a fingering display program capable of also giving instructions on a sound volume at the time of key pressing in an intuitive manner by a fingering moving image in performing a fingering display for a keyboard instrument.

Additionally, still another object of the present invention is to provide a fingering display program capable of reliably instructing a practicing person (player) on necessary information even when the left hand and the right hand approach or cross and both hands overlap in performing a fingering display for a keyboard instrument.

Solution to Problem

In order to achieve the above-described objects, the present invention is a fingering display program to perform fingering display on a screen by drawing a fingering moving image of playing a musical instrument in a musical piece reproduction based on playing information including respective musical sounds of a musical piece and corresponding finger numbers, wherein when generating a fingering drawing based on fingering position information (Pm) corresponding to a reproduction time (T) in the musical piece reproduction, the fingering display program makes a computer execute:

generating the fingering position information (Pm) based on single key pressing information corresponding to a single time among times including at least a time before the reproduction time (T) and a time after the reproduction time (T), and synthetic key pressing information obtained by synthesizing respective key pressing information at a plurality of different times.

The present invention is a fingering display program to perform fingering display on a screen by drawing a fingering moving image of playing a musical instrument in a musical piece reproduction based on playing information including respective musical sounds of a musical piece and corresponding finger numbers, wherein when generating a fingering drawing based on fingering position information (Pm) corresponding to a reproduction time (T) in the musical piece reproduction, the fingering display program makes a computer execute:

setting, a time (T2) being a key pressing time after and closest to the reproduction time (T) from a key releasing time when key pressing changes to key releasing at the reproduction time (T), and a time (T1) just before changing to key pressing information at the time (T2); and generating fingering position information (Pm) so that shifting to a fingering position corresponding to the key pressing information at the time (T2) completes before the reproduction time (T) elapses a predetermined time from the time (T1), when a time period from the time (T1) to the time (T2) is longer than a desired time.

The another present invention is a fingering display program to perform fingering display on a screen by drawing a fingering moving image of playing a musical instrument in a musical piece reproduction based on key pressing information of a musical piece, wherein when generating a fingering drawing based on fingering position information corresponding to a reproduction time in the musical piece reproduction, the fingering display program makes a computer execute functions of:

preparing a key pressing fingering image at the time of key pressing at the reproduction time, a key releasing fingering image at the time of key releasing just before the key pressing, and a dark-colored fingering shadow image;

simultaneously displaying either the key pressing fingering image and the fingering shadow image or the key releasing fingering image and the fingering shadow image; and displaying the key releasing fingering image so as to increase an offset according to a sound volume at the time of the next key pressing with respect to the fingering shadow image.

The present invention is a fingering display program to perform fingering display on a screen by drawing a fingering moving image of playing a musical instrument in a musical piece reproduction based on key pressing information of a musical piece, wherein when generating fingering images for the left hand and the right hand based on fingering position information corresponding to a reproduction time in the musical piece reproduction, the fingering display program makes a computer execute functions of:

in a case where fingering images for the left hand and the right hand overlap, drawing foremost a hand corresponding to a musical sound whose sound production starting time is the latest among musical sounds as key pressing targets at a current reproduction position; and in a case where there is no musical sound as a key pressing target at a current reproduction position and neither of the hands presses a key, drawing foremost a hand including a finger that will press a key next.

Advantageous Effects of Invention

According to the present invention, when generating a fingering drawing based on fingering position information (Pm) corresponding to a reproduction time (T) in a musical piece reproduction, the fingering position information (Pm) is generated based on synthetic key pressing information obtained by synthesizing key pressing information at a plurality of different times including a time before the reproduction time (T) and a time after the reproduction time (T) (fingering position information Ps at a time before the reproduction time and fingering position information Pe at a time after the reproduction time), so that by including previous and next finger position information in movements of the back of the hand and the fingers, a moving distance of the back of the hand can be minimized and a fingering moving image close to actual keyboard operations can be drawn.

Also, according to the present invention, a time (T2) being a key pressing time after and closest to the reproduction time (T) from a key releasing time when key pressing changes to key releasing at the reproduction time (T), and a time (T1) just before changing to key pressing information at the time (T2), are set, whether a time period from the time (T1) to the time (T2) is longer than a desired time period is detected, and further, an elapsed time after key releasing at the time (T1) is determined, and accordingly, a fingering image can be generated so that hand movement completes as early as possible in the time period before the next key pressing time comes.

Further, according to the present invention, when generating a fingering drawing based on fingering position information corresponding to a reproduction time in a musical piece reproduction, with respect to a fingering shadow image, by offsetting and displaying a key releasing fingering image according to a sound volume of the next key pressing and a remaining time before the key pressing, instructions on a sound volume at the time of key pressing can also be given in an intuitive manner by a fingering moving image.

Additionally, according to the present invention, when fingering images for the left hand and the right hand overlap, a hand corresponding to a musical sound whose sound production starting time is the latest among musical sounds as key pressing targets at a current reproduction position is drawn foremost, and when there is no musical sound as a key pressing target at a current reproduction position and neither of the hands presses a key, a hand including a finger that will press a key next is drawn foremost, and accordingly, information on a key that should be pressed last (a hand shape and a position of the back of the hand, a finger that should press a key, and a position of the key to be pressed) can be reliably displayed foremost.

In the case where fingering images for the left hand and the right hand overlap, when the left hand and the right hand simultaneously press keys, by drawing a hand with the higher difficulty level foremost, information on the fingers of the hand with the higher difficulty level, that is more important to a practicing person, can be preferentially displayed.

In the case where fingering images for the left hand and the right hand overlap, by setting transmissivity of a hand to be displayed foremost to be lower than that of the other hand, while the fingering image for the hand displayed foremost is made easily viewable, the fingering image for the back hand can also be checked at the same time.

BRIEF DESCRIPTION OF DRAWINGS

FIG. 8 is a correspondence diagram showing fingering images to be generated in consideration of key pressing information at a start point and an end point with respect to a reproduction time (current time) (state A to state J).

FIG. 9 is a correspondence diagram showing fingering images to be generated in consideration of key pressing information at a start point and an end point with respect to a reproduction time (current time) (state K to state U).

FIG. 26A is one of the image views chronologically showing fingering image examples to be displayed according to the musical score shown in FIG. 25.

FIG. 26B is one of the image views chronologically showing fingering image examples to be displayed according to the musical score shown in FIG. 25.

FIG. 26C is one of the image views chronologically showing fingering image examples to be displayed according to the musical score shown in FIG. 25.

FIG. 26D is one of the image views chronologically showing fingering image examples to be displayed according to the musical score shown in FIG. 25.

FIG. 26E is one of the image views chronologically showing fingering image examples to be displayed according to the musical score shown in FIG. 25.

FIG. 26F is one of the image views chronologically showing fingering image examples to be displayed according to the musical score shown in FIG. 25.

FIG. 26G is one of the image views chronologically showing fingering image examples to be displayed according to the musical score shown in FIG. 25.

FIG. 26H is one of the image views chronologically showing fingering image examples to be displayed according to the musical score shown in FIG. 25.

FIG. 29 is a flowchart for generating fingering images for the left hand and the right hand (both hands) in the fingering display program of the present invention.

DESCRIPTION OF EMBODIMENTS

Figure 1:
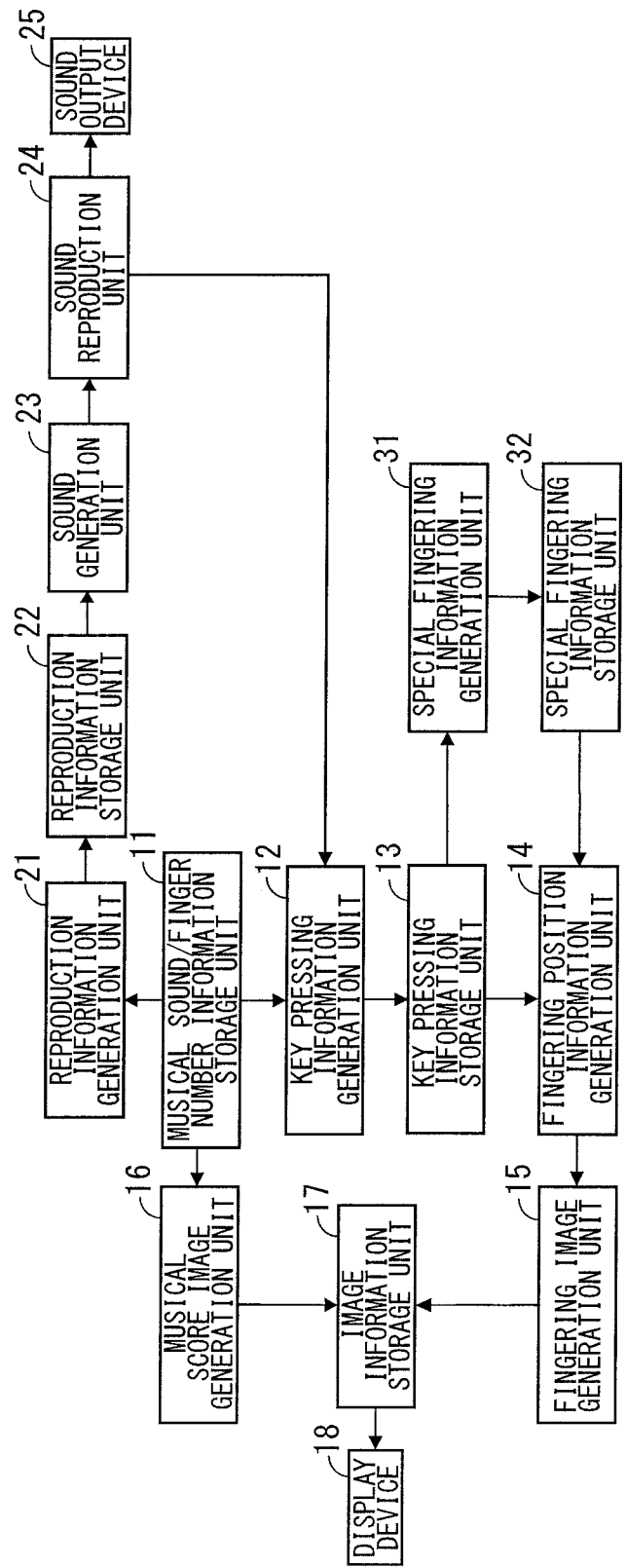
FIG. 1 is a function block diagram showing a configuration of a fingering display device of the present invention.

Hereinafter, a fingering display device of the present invention is described with reference to the drawings.

The fingering display device is configured by installing a fingering display program in a known tablet type terminal including a CPU, a ROM, a RAM, and a hard disk, etc., to display musical score data and execute fingering display corresponding to the musical score data. The tablet type terminal includes a display unit capable of displaying a musical score and a keyboard, a touch panel having an input unit for inputting a touch operation, and a sound output device such as a speaker to reproduce sounds. On the display unit, a keyboard and a fingering image showing a hand position are displayed together, and a user can practice fingering with a keyboard instrument, etc., with the help of the displayed fingering image.

The CPU of the fingering display device executes various processes based on the installed predetermined control program (fingering display program), and controls the entire fingering display device.

To the tablet type terminal, an MIDI device is connectable via an MIDI interface. Playing data and fingering drawing data can be stored in the ROM inside the tablet type terminal, or provided from the outside via an MIDI interface or by a recording medium.

As a usage example of the fingering display device, the fingering display device is connected to a digital piano, for example, and demonstration playing is performed by displaying musical score data recorded in the device and sounding with a sound source of the digital piano by transmitting playing data corresponding to the musical score data to the digital piano side. In addition, a user plays the digital piano while looking at the musical score displayed on the fingering display device, and results of the playing are input to the device side and compared with model playing data corresponding to the musical score data displayed on the device side, and accordingly, the state of playing by the user is checked (evaluated).

A fingering display device configured by installing a fingering display program stored in, for example, a recording medium to execute processing according to the present invention for the tablet type terminal is described with reference to the function block diagram shown in FIG. 1.

The fingering display device includes a musical sound/finger number information storage unit 11 having stored musical sound information for playing and finger number information for performing fingering display corresponding to respective musical sounds, a key pressing information generation unit 12 that generates key pressing information from the musical sound/finger number information, a key pressing information storage unit 13 that stores the key pressing information, a fingering position information generation unit 14 that generates fingering position information from the key pressing information, and a fingering image generation unit 15 that generates a fingering image from the fingering position information.

In addition, the fingering display device includes a musical score image generation unit 16 that generates a musical score image from musical score information included in fingering information, and images generated in the fingering image generation unit 15 and the musical score image generation unit 16 are stored in the image information storage unit 17, and displayed on the display device 18 such as a display, etc.

In addition, the fingering display device includes a reproduction information generation unit 21 that reproduces reproduction information for reproduction of a musical piece from the musical sound information stored in the musical sound/finger number information storage unit 11, a reproduction information storage unit 22 that stores the reproduction information, a sound generation unit 23 that generates sounds from the reproduction information, a sound reproduction unit 24 that converts the sound into an analog signal, and a sound output device 25 including an amplifier and a speaker, etc.

In the musical sound/finger number information storage unit 11, minimum necessary information for musical piece reproduction and fingering drawing, such as musical sounds constituting a musical score, and finger numbers corresponding to the musical sounds, etc., are stored.

The key pressing information generation unit 12 generates key pressing information at an arbitrary time in a period from the beginning to the end of a musical piece based on information stored in the musical sound/finger number information storage unit 11. As the key pressing information, information on a target time and playing hands and finger numbers, sound volumes, note numbers, and presence of special fingering flags for respective musical sounds of keys being pressed at the target time, are prepared. The special fingering includes a finger change, crossing under, and crossing over in terms of playing techniques.

The key pressing information prepared in the key pressing information generation unit 12 is stored in the key pressing information storage unit 13.

When key pressing information stored in the key pressing information storage unit 13 includes special fingering, the fingering display is determined as needing special fingering, special fingering information is generated in a special fingering information generation unit 31 from the key pressing information generated by the key pressing information generation unit 12, and stored in a special fingering information storage unit 32. Whether fingering display includes special fingering is determined from the key pressing information generated in the key pressing information generation unit 12.

The fingering position information generation unit 14 generates fingering position information Pm at a reproduction time (a time of a current reproduction position from the beginning of the musical piece) T based on information stored in the key pressing information storage unit 13. This fingering position information Pm is generated based on single key pressing information corresponding to a single time among times including a time before the reproduction time T and a time after the reproduction time T, and synthetic key pressing information obtained by synthetizing respective key pressing information at a plurality of different times (fingering position information Ps at a time before the reproduction time T, and fingering position information Pe at a time after the reproduction time T). Detailed steps of generating the fingering position information Pm based on the fingering position information Ps and the fingering position information Pe are described later.

The fingering position information Pm is information for drawing a hand position and a finger arrangement in a fingering image. The fingering position information includes positional data of the center of the back of a hand, positional data of bases of the respective five fingers, positional data of two base points (thumb side and little finger side) of the wrist, and positional data of tips of the respective fingers. By providing these pieces of information, drawing of a fingering image is enabled. In order to determine positions of the respective portions of a hand position with respect to keys, provision of data representing the positional relationship between the positional data and the keys is necessary.

As a method of obtaining a fingering image from fingering position information, a publicly known method shown in, for example, the above-described Patent Literature 1 (Japanese Patent No. 3521838) or Patent Literature 2 (Japanese Patent No. 4070100) is used.

The fingering image generation unit 15 generates a fingering image at the reproduction time T based on information prepared in the fingering position information generation unit 14. The fingering image is prepared from information on a hand shape and coordinates of finger positions corresponding to fingering position information.

The musical score image generation unit 16 generates a musical score image based on information stored in the musical sound/finger number information storage unit 11.

The fingering image prepared in the fingering image generation unit 15 and the musical score image prepared in the musical score image generation unit 16 are stored as image information in the image information storage unit 17.

On the display device 18, image information stored in the image information storage unit 17 is displayed.

Figure 2:
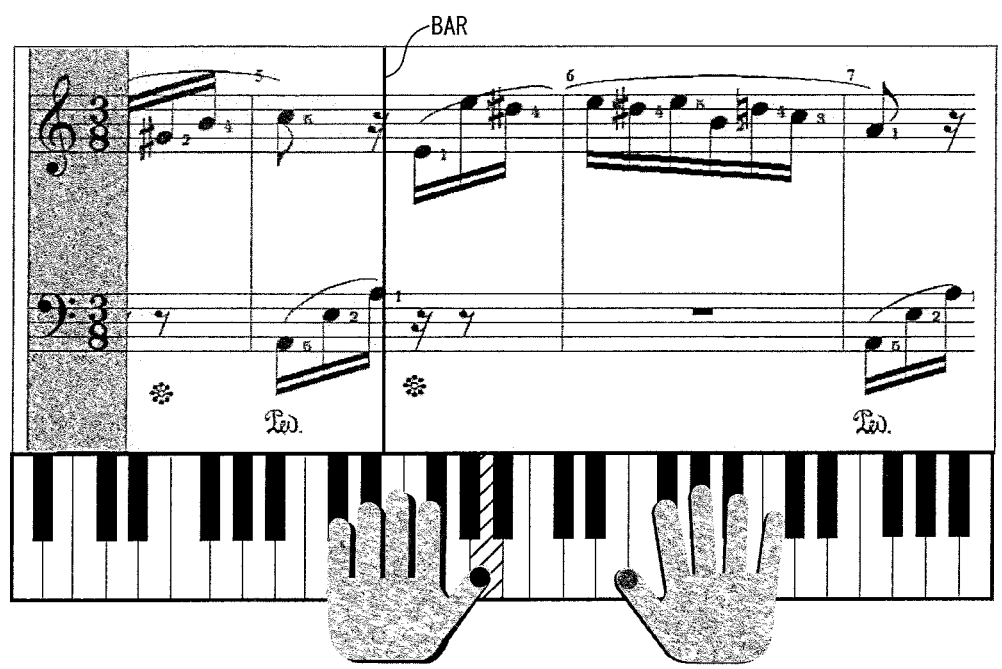
FIG. 2 is a display example of a musical score, a keyboard, and a fingering image to be displayed on a display unit of the fingering display device.

That is, based on key pressing information corresponding to musical sounds in a musical score, a fingering moving image of playing a musical instrument is displayed on a screen in a musical piece reproduction. As a specific image display, as shown in FIG. 2, a musical score is displayed in an upper part, and a keyboard and a fingering image for playing respective musical sounds of the musical score with both hands are displayed in a lower part thereunder. In the musical score area, a bar BAR corresponding to the reproduction time T, which moves on the stave portion according to the progression of playing, is displayed, and a key pressing state at the reproduction time is drawn as the fingering image. A pressed key is changed in color (hatched in FIG. 2).

In place of a musical score, playing information such as a piano roll may be displayed.

The reproduction information generation unit 21 generates musical sound reproduction information based on information stored in the musical sound/finger number information storage unit 11. As the reproduction information, MIDI information including a sound production starting time and a sound production ending time, a sound volume, and a note number of each musical sound is prepared.

Reproduction information prepared in the reproduction information generation unit 21 is stored in the reproduction information storage unit 22.

In the sound generation unit 23, sound information consisting of an analog signal is generated according to the reproduction information.

In the sound reproduction unit 24, an analog signal corresponding to the sound information is reproduced. In the generation of key pressing information by the key pressing information generation unit 12, time information is input from the sound reproduction unit 24 so that key pressing information corresponding to the reproduction time of the musical piece is generated.

In the sound output device 25, the analog signal as sound information is output through the amplifier and the speaker so as to reproduce a sound.

Next, steps of preparing a fingering drawing according to the above-described fingering display program is described with reference to the time chart for the keyboard shown in FIG. 3 and the flowcharts shown in FIG. 4 and FIG. 5.

In the fingering display device, by the stored fingering display program, fingering position information is generated based on key pressing information, and a fingering image is generated based on the fingering position information and drawn on the display unit.

In the fingering display program of the present invention, a control is performed so that a movement of the back of a hand in the keyboard width direction is reduced and a fingering moving image close to an actual keyboard operation is drawn. Therefore, with respect to the reproduction time T in a musical piece reproduction, in a case where key pressing times and key releasing times on the keyboard are as shown in FIG. 3, when generating a fingering image based on fingering position information Pm corresponding to the reproduction time T, the fingering position information Pm is generated based on single key pressing information corresponding to a single time among times including a time before the reproduction time T and a time after the reproduction time T, and synthetic key pressing information obtained by synthetizing respective key pressing information at a plurality of different times.

The fingering position information Pm consists of fingering position information (coordinates of bases and tips of the respective fingers, and central coordinates of the back of a hand) at the reproduction time T.

The fingering position information Pm is calculated by interpolating, for example, fingering position information Ps at a start point time and fingering position information at an end point time. When the reproduction time is at a key releasing time, the start point time is a key pressing time T1 just before key releasing before and closest to the reproduction time in FIG. 3, and the end point time is a key pressing time T2 after and closest to the reproduction time. Conversely, when the reproduction time is at a key pressing time, both of the start point time T1 and the end point time T2 are the same as the reproduction time T, and interpolation is unnecessary.

Next, steps of generating fingering position information Ps at the start point time and fingering position information Pe at the end point time, and from these, obtaining fingering position information Pm so as to prepare a fingering image in the fingering position information generation unit 14 and the fingering image generation unit 15, are described with reference to the fingering image drawing flowchart in FIG. 4 and the fingering position information generating flowchart in FIG. 5.

Figure 3:
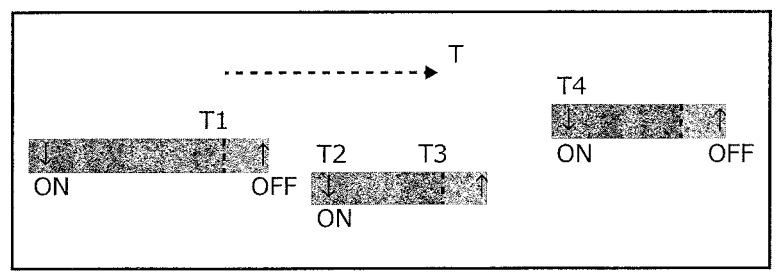
FIG. 3 is a time chart for describing key pressing times and key releasing times for keys.

A fingering image is prepared by considering key pressing information, etc., at the respective times T1, T2, T3, and T4 around and closest to the time T (reproduction time: time of a current reproduction position from the beginning of the musical piece, being a musical piece reproduction position) in FIG. 3.

T1 is a time corresponding to a time just before key releasing before and closest to T. T1 may be a time a predetermined time before the key releasing time. This is because, when a time period from a key releasing time to a next key pressing time is short, fingering display is instantaneously switched to next fingering display, and therefore, by setting a time a predetermined time before the key releasing time, fingering display smoothly shifts.

T2 is a key pressing time after and closest to T when T is at a key releasing time, and is a key pressing time before and closest to T when T is at a key pressing time.

T3 is a key releasing time after and closest to T2 (a time corresponding to a time of key releasing next to key pressing at T2, for example, a time a predetermined time before the key releasing time).

T4 is a key pressing time after and closest to T2 (a time of key pressing next to key pressing at T2).

In the case of the key pressing/key releasing states of the keys (square portions) as shown in FIGS. 3, T1, T2, T3, and T4 are at the positions (times) shown by the arrows with respect to ON (key pressing) and OFF (key releasing) of keys.

The key releasing time corresponds to a time a predetermined time before an actual key releasing time so as to make the shift of fingering as smooth as possible as described above.

In the fingering display device, information FI on shapes of the respective fingers and the back of the hand, including a relative length of the back of the hand with respect to a keyboard width, and relative positions of the respective fingers from the back of the hand, are stored (Step 51).

Based on a reproduction time (musical piece reproduction position) T, closest T1, T2, T3, and T4 are scanned and readout from key pressing information and key releasing information with respect to a musical score (Step 52).

Single key pressing information FK1, FK2, and FK4 corresponding to T1, T2, and T4, respectively, are generated (Step 53).

FK1 is key pressing information (key pressing flags for respective fingers, and key numbers) at time T1.

FK2 is key pressing information (key pressing flags for respective fingers, and key numbers) at time T2.

FK4 is key pressing information (key pressing flags for respective fingers, and key numbers) at time T4.

Synthetic key pressing information FK12 obtained by synthesizing FK1 (key pressing information at time T1) and FK2 (key pressing information at time T2), and synthetic key pressing information FK24 obtained by synthesizing FK2 (key pressing information at time T2) and FK4 (key pressing information at time T4), are respectively generated (Step 54).

Whether the musical piece reproduction position is before first key pressing (whether T1 is invalid and T<T2) is determined (Step 55).

When the musical piece reproduction position is before the first key pressing, fingering information Ps is prepared (preparation of start-point coordinates of fingering) from FK1 (key pressing information at time T1) and FI (Step 56), and whether the musical piece reproduction position is a predetermined time or more before the first key pressing (whether T1 is invalid and T<T2−Tmin) is determined (Step 57). Tmin is a time period for determining whether it is a predetermined time or more before key pressing, and is set to "96" (delta time as long as a quarter note) determined in advance, in the present example.

When the musical piece reproduction position is a predetermined time or more before the first key pressing, FK1 (key pressing information at time T1) is used as fingering information Pe (preparation of end-point coordinates of fingering) (Step 58).

The fingering information Ps is fingering position information (base coordinates/tip coordinates of the respective fingers, and central coordinates of the back of the hand) at a start point time of fingering.

The fingering information Pe is fingering position information (base coordinates/tip coordinates of the respective fingers, and central coordinates of the back of the hand) at an end point time of fingering.

In Step 57, when the reproduction time T is not a predetermined time or more before the key pressing, whether fingering information Pe can be generated from FK24 is determined (Step 59). This is determined according to whether the respective key pressing information FK2 and FK4 can be synthesized, and they are determined to be not capable of being synthesized when key pressing positions of the respective fingers in the synthetic key pressing information are not less than a predetermined range. When the synthesis of the respective key pressing information FK2 and FK4 is possible, fingering information Pe is generated from the key pressing information FK24 (Step 60). When the synthesis is not possible, fingering information Pe is generated from the key pressing information FK2 (Step 61). FK24 is key pressing information (key pressing flags for the respective fingers, and key numbers) obtained by synthesizing the key pressing information FK2 and FK4.

HFs being special fingering information (flags showing whether to make a finger change, crossing under, or crossing over) at the fingering start point, and HFe being special fingering information (flags showing whether to make a finger change, crossing under, or crossing over) at the fingering end point, are respectively generated (Step 62).

Subsequently, whether the reproduction time T is during key pressing is determined (Step 63).

When it is during key pressing, key pressing information Ps at the fingering start point and key pressing information Pe at the fingering end point become the same value.

When the reproduction time T is during key pressing, whether a time period from T3 (key releasing time after and closest to T2) to T4 (key pressing time after and closest to T2) is shorter than Tmin being a threshold time period set in advance is determined (Step 64). Tmin is a threshold of a permissible time period for determining that FK2 and FK4 should be synthesized, and set to "96" determined in advance, in the present example.

When the time period from T3 to T4 is shorter than the threshold time period Tmin, whether fingering position information Ps (fingering position information Pe) can be generated based on FK24 (synthetic key pressing information) and FI is determined (Step 65).

When it is determined that it can be generated in Step 65, fingering information Ps/Pe is generated based on FK24 (synthetic key pressing information) and FI (Step 66).

Subsequently, by using the special fingering information HFs/HFe generated in Step 62, the fingering information (start-point coordinates) Ps at the start point time and the fingering information (end-point coordinates) Pe at the end point time are corrected (Step 67).

In Step 64, when the time period from T3 to T4 is determined to be longer than the threshold time period Tmin, in consideration of key pressing information at a subsequent time is determined to be unnecessary, and fingering information Ps at the start point time (fingering position information Pe at the end point time) is generated from FK2 (key pressing information at time T2) and FI (Step 68). When fingering position information is determined that it cannot be generated in Step 65, key pressing positions of fingers to be synthesized are determined to be away from each other, and fingering information Ps at the start point time (fingering position information Pe at the end point time) is also generated from FK2 (key pressing information at time T2) and FI (Step 68). Thereafter, the respective coordinates of the fingering position information Ps at the start point time and the fingering position information Pe at the end point time are corrected according to the special fingering information HFs/HFe (Step 67).

Figure 5:
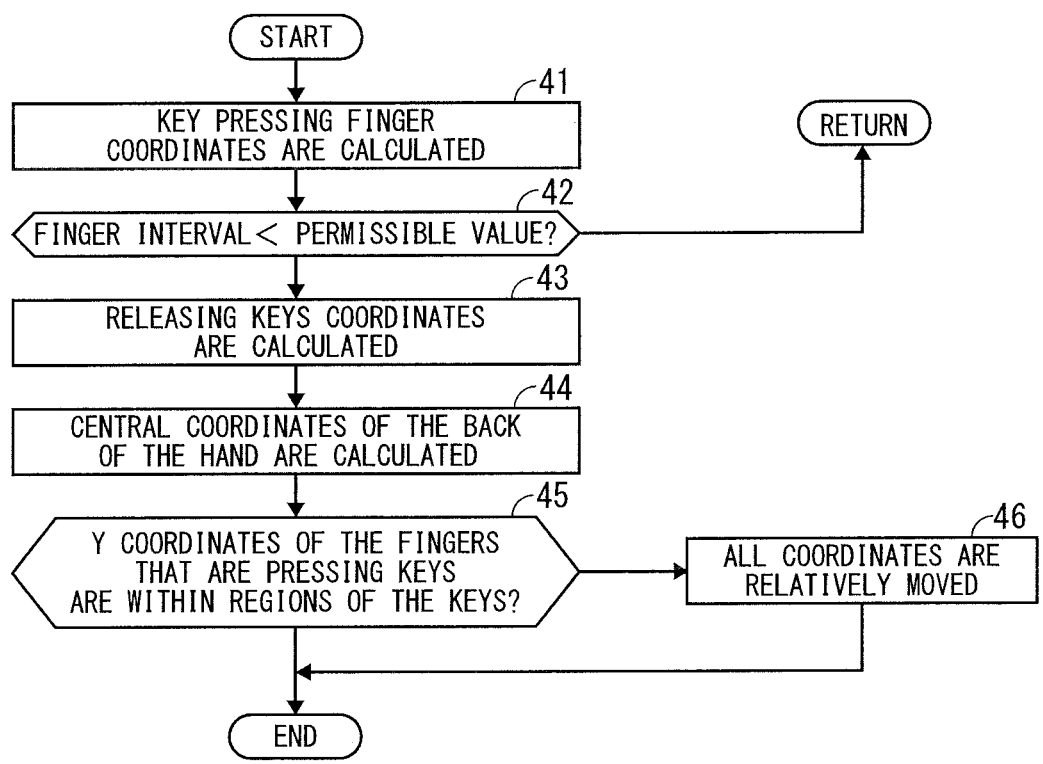
FIG. 5 is a flowchart of fingering position information generation in the fingering display program of the present invention.

When generating the fingering information Ps and Pe in the respective steps, fingering position information is prepared in the fingering position information generation unit 14 of the fingering display device shown in FIG. 1, and in this case, the fingering position information is prepared through steps shown in the flowchart of FIG. 5.

First, key pressing finger coordinates are calculated (Step 41).

Next, whether a distance between X coordinates of the fingers pressing keys is within a permissible value of a maximum finger interval is determined (Step 42).

When the finger interval between the fingers pressing keys is within the permissible value, coordinates of the fingers that are releasing keys are calculated (Step 43), central coordinates of the back of the hand are calculated (Step 44), and whether Y coordinates (keyboard depth direction) of the fingers that are pressing keys are within regions of the keys corresponding to the respective key pressing fingers is determined (Step 45).

When the Y coordinates of the respective key pressing fingers are out of the key regions, all coordinates are relatively moved by a distance that makes the Y coordinates of all key pressing fingers fall within the key regions and come to the front side of the keyboard to the extent possible (Step 46), and fingering position information is established.

On the other hand, in Step S43, when the finger interval exceeds the permissible value, the process returns without obtaining fingering position information.

Figure 4:
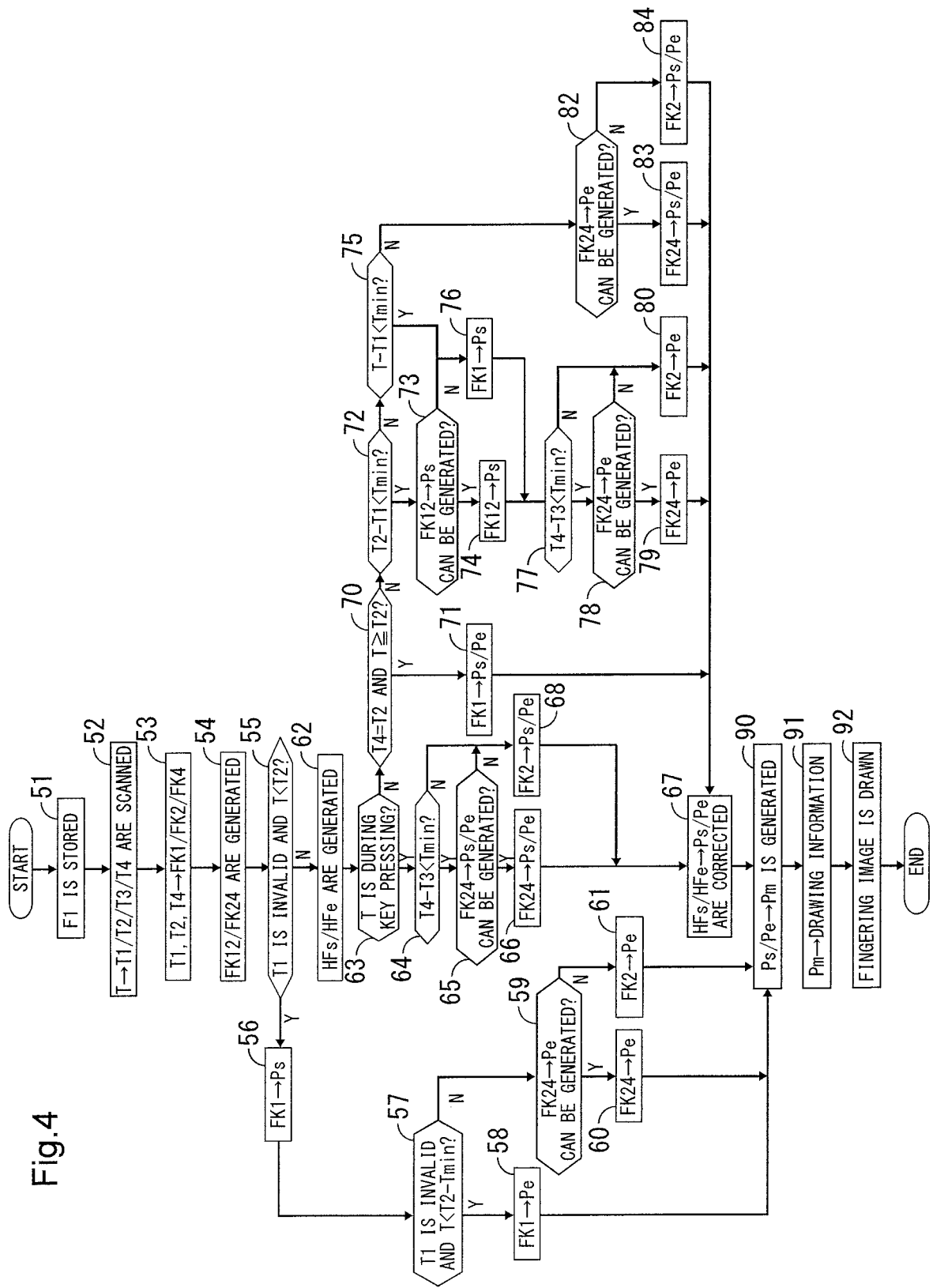
FIG. 4 is a flowchart of fingering drawing generation in a fingering display program of the present invention.

Returning to the flowchart in FIG. 4, when the reproduction time T is not during key pressing in Step 63, whether T4 is invalid and T is not less than T2 (there is no next key pressing) is determined (Step 70).

When T4 (key pressing time after and closest to T2) is not found (there is no next key pressing), start-point coordinates Ps (=end-point coordinates Pe) of fingering are generated from FK1 (key pressing information at time T1) and H (Step 71), and the start-point coordinates Ps and the end-point coordinates Pe are corrected according to the special fingering information HFs/HFe (Step 67).

In Step 70, when T4 (key pressing time after and closest to T2) is found (there is a next key pressing), whether a time period from T1 {time corresponding to a key releasing time before and closest to T (time a predetermined time before the key releasing time, etc.)} to T2 (key pressing time after and closest to T when T is at a key releasing time, or key pressing time before and closest to T when T is at a key pressing time) is shorter than Tmin being a threshold time period set in advance is determined (Step 72). Tmin is a threshold of a permissible time period for determining that FK1 and FK2 should be synthesized, and is set to "96" determined, in advance in the present example.

When the time period from T1 to T2 is shorter than the threshold time period Tmin, whether fingering information Ps (fingering position information at a start point time of fingering) can be generated based on FK12 {key pressing information (key pressing flags for the respective fingers, key numbers) obtained by synthesizing key pressing information FK1 and FK2} and FI is determined (Step 73).

When it can be generated, fingering position information Ps at the start point time of fingering is generated from FK12 and FI (Step 74).

In Step S72, when the time period from T1 to T2 is longer than the threshold time period Tmin set in advance, whether the time period from T1 to T (reproduction time) is shorter than the threshold time period Tmin set in advance is determined (Step 75).

That is, when the time period from T1 to T2 is longer than a desired time period in Step 72, a fingering image that makes the preceding movement is displayed, and in the case of "Y" in Step 75, the fingering image is making a preceding movement, and in the case of "N" in Step 75, the preceding movement ends and the state turns into a state of waiting for next key pressing.

When fingering information Ps (fingering position information at the start point time) is determined that it cannot be generated in Step 73, or when the time period from T1 to T is longer than the threshold time period Tmin set in advance in Step 75, start-point coordinates Ps of fingering are generated from FK1 (key pressing information at time T1) and FI (Step 76).

When start-point coordinates Ps of fingering are generated in Step 74 and Step 76, whether the time period from T3 {key releasing time after and closest to T2 (time of key releasing next to key pressing at T2)} to T4 {key pressing time after and closest to T2 (time corresponding to time of key pressing next to key pressing at T2)} is shorter than the threshold time period Tmin set in advance is determined (Step 77). Tmin is a threshold of a permissible time period for determining that FK2 and FK4 should be synthesized, and is set to "96" determined in advance, in the present example.

When the time period from T3 to T4 is shorter than the threshold time period Tmin in Step 77, whether fingering information Pe (fingering position information at the end point time) can be generated based on FK24 {key pressing information obtained by synthesizing key pressing information FK2 and FK4 (key pressing flags for the respective fingers, key numbers)} and H is determined (Step 78).

When it can be generated, fingering position information Pe at the end point time is generated from FK24 and FI (Step 79), and respective coordinates of the fingering position information Ps at the start point time and the fingering position information Pe at the end point time are corrected according to the special fingering information HFs/HFe (Step 67).

When the time period from T3 to T4 is longer than the threshold time period Tmin in Step 77, or when the fingering information Pe is determined that it cannot be generated in Step 78, fingering position information Pe at the end point time is generated from FK2 and FI (Step 80), and respective coordinates of the fingering position information Ps at the start point time and the fingering position information Pe at the end point time are corrected according to the special fingering information HFs/HFe (Step 67).

When the time period from T1 to T is longer than the threshold time period Tmin in Step 75, whether fingering position information Pe can be generated from FK24 is determined (Step 82), and when it can be generated, fingering position information Ps and Pe are generated from FK24 (Step 83), and when it cannot be generated, fingering position information Ps and Pe are generated from FK2 (Step 84). In this case, a key pressing waiting state has been entered, so that the fingering information Ps and the fingering information Pe are the same.

Then, respective coordinates of the fingering position information Ps at the start point time and the fingering position information Pe at the end point time are corrected according to the special fingering information HFs/HFe (Step 67).

After start-point coordinates of the fingering position information Ps and end-point coordinates of the fingering position information Pe are corrected in Step 67, movement interpolated coordinates Pm (Pmx, Pmy) at the reproduction time T are generated from the start-point coordinates Ps (Psx, Psy) and the end-point coordinates Pe (Pex, Pey) (Step 90).

The fingering position information Pm consists of fingering position information (coordinates of bases and tips of the respective fingers, central coordinates of the back of the hand) at the reproduction time T.

When the end-point coordinates Pe are generated in Step 57, Step 59, and Step 60, they are not based on synthetic key pressing information obtained by synthesizing key pressing information at a plurality of different times, so that correction according to a finger change, crossing under, or crossing over is not necessary, and movement interpolated coordinates Pm (Pmx, Pmy) at the reproduction time T are generated from the start-point coordinates Ps (Psx, Psy) and the end-point coordinates Pe (Pex, Pey) (Step 90).

The X coordinate (Pmx) and Y coordinate (Pmy) of the movement interpolated coordinates Pm are calculated by the following formulas (1) and (2) when Ts is the start point time, Te is the end point time, and T is a current time.

$$Pmx = Psx + (Pex - Psx) \times (T - Ts)/(Te - Ts) \quad (1)$$

$$Pmy = Psy + (Pey - Psy) \times (T - Ts)/(Te - Ts) \quad (2)$$

Next, drawing information is generated from the movement interpolated coordinates Pm generated in Step 90 (Step 91).

Subsequently, a fingering image is drawn based on the drawing information generated in Step 91 (Step 92), and the processing of fingering drawing is ended.

In the flowchart described above, Tmin that is a threshold of a permissible time period for determining that FK2 and FK4 should be synthesized in Step 56, Step 64, and Step 77, and Tmin that is a threshold of a permissible time period for determining that FK1 and FK2 should be synthesized in Step 72 and Step 75, are all set to the same time interval "96,"

however, they may be respectively set to individual time intervals. Tmin is set to not an actual time but a delta time so as to become a short time when the tempo is fast and become a long time when the tempo is slow.

Subsequently, examples of a fingering image to be generated in response to a detailed musical score are described with reference to FIG. 6 to FIG. 9.

Figure 6:
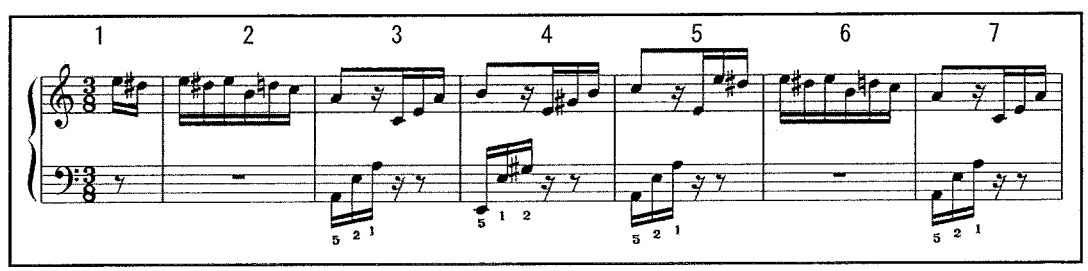
FIG. 6 is a view showing an example of a musical score.
Figure 7:
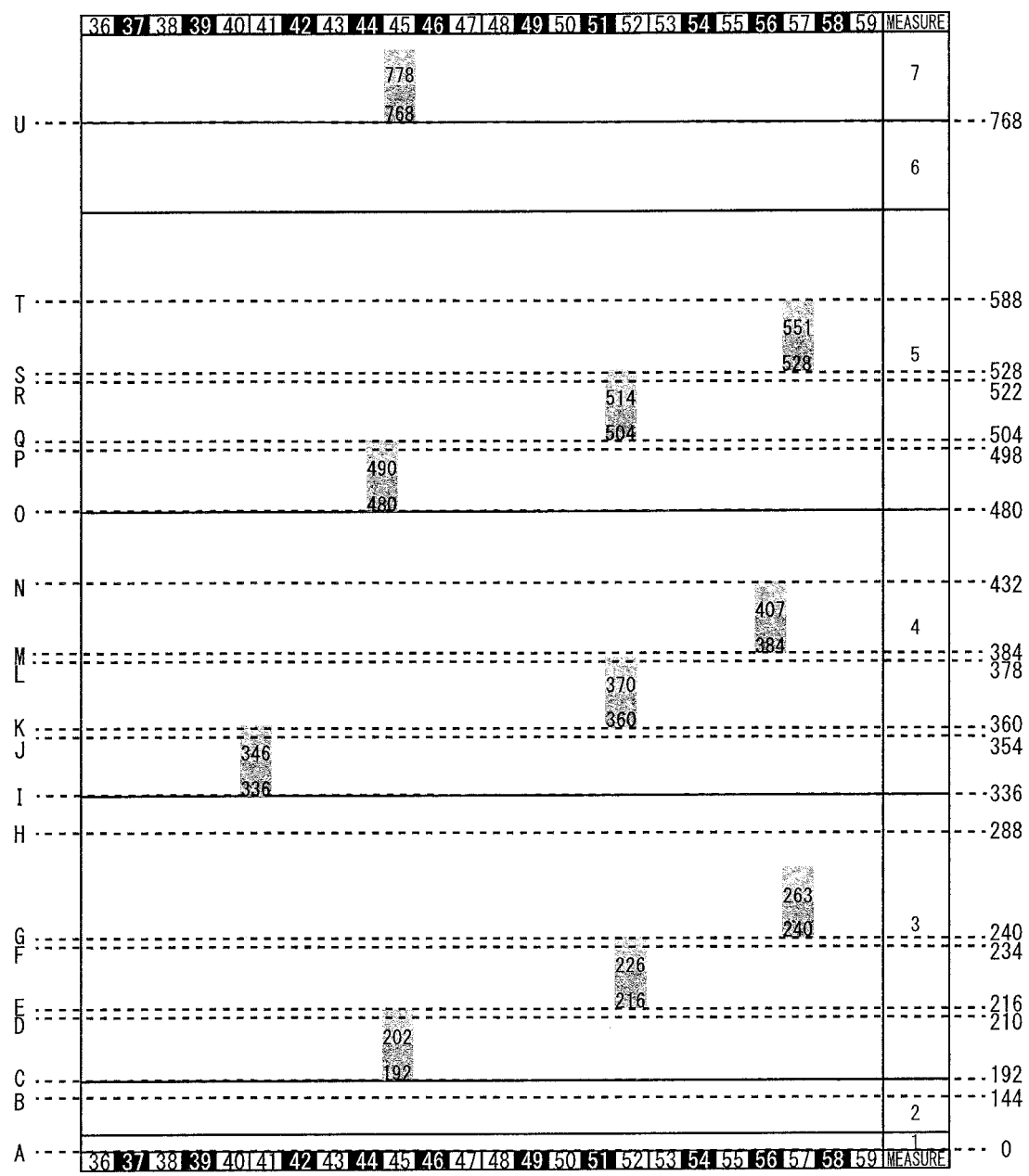
FIG. 7 is a piano roll view showing key pressing information corresponding to the musical score shown in FIG. 6.

FIG. 6 shows a musical score showing measure 1 to measure 7 of a musical piece "For Elise," and an upper stave is a right hand playing part and a lower stave is a left hand playing part. FIG. 7 shows a piano roll of a left hand playing part corresponding to the musical score shown in FIG. 6.

In the piano roll shown in FIG. 7, the measure progresses from bottom up, keys (note numbers 36 to 59) being a part of the keyboard are displayed in the left-right direction, and a portion displayed as a square in an upper region of each key shows a key-pressed state. Therefore, a lower end position of the square portion is a key pressing start position, and an upper end portion is a key releasing position, and a numeral displayed at the lower end position is a key pressing time (for example, key pressing time 192 corresponding to the note number 45 displayed in the lowest line), and a numeral displayed at a substantially central position is a time a predetermined time before a key releasing time (for example, before-key-releasing time 202 of the note number 45).

FIG. 8 and FIG. 9 are correspondence tables showing fingering images to be generated from key pressing information at arbitrary reproduction times T in measure 1 to measure 7 of the musical score shown in FIG. 6.

In FIG. 8, in each of states A to J at the respective reproduction times T of "time 0," "time 144," "time 192," "time 210," "time 216," "time 234," "time 240," "time 288," "time 336," and "time 354," a fingering image is generated from the above-described fingering information (fingering position information) Ps at the start point time and fingering information (fingering position information) Pe at the end point time. The fingering position information includes a time (delta time) and key pressing information (note numbers with respect to key pressing fingers, special fingering information). The special fingering information is controlled by the presence of flags.

FIG. 9 shows fingering images in respective states K to U at the respective reproduction times T of "time 360," "time 378," "time 384," "time 432," "time 480," "time 498," "time 504," "time 522," "time 528," "time 588," and "time 768."

The generation of fingering images in the respective states is described in order from the state A (reproduction time T=0) shown in FIG. 8.

When the reproduction time T is "0," in the scanning in Step 52 of the flowchart of FIG. 4, T1 is invalid (there is no time corresponding to a key releasing time before and closest to T), and since the reproduction time T is at a key releasing time, T2 is the "time 192" being a key pressing time after and closest to T, T3 is the "time 202" being a key releasing time after and closest to T2, and T4 is the "time 216" being a key pressing time after and closest to T2.

When the reproduction time T is "0," T1 is invalid and T<T2 is satisfied, so that the result of the determination in Step 55 is "Y," and fingering position information Ps at the start point time is FK1 (Step 56), and by satisfying the condition of Step 57, fingering position information Pe at the end point time is also FK1 (Step 58). FK1 in this case is key pressing information for an initial image with a home position because of the absence of T1.

The fingering position information Pm at the reproduction time T to be generated in Step 90 is obtained by synthesizing fingering position information Ps and fingering position information Pe, and these are key pressing information of the initial image, so that a fingering image to be drawn based on the fingering position information Pm is also the initial image.

In the state B where the reproduction time T is "144," in the scanning in Step 52 of the flowchart of FIG. 4, T1 is invalid, and since the reproduction time T is at a key releasing time, T2 is the "time 192" being a key pressing time after and closest to T, T3 is the "time 202," and T4 is the "time 216."

When the reproduction time T is "144," as in the case of T=0, T1 is invalid, and T<T2 is satisfied, so that the result of the determination in Step 55 is "Y," and fingering position information Ps at the start point time is FK1 (Step 56).

In Step 57, since Tmin is set to "96," the condition of Step 57 is not satisfied, and accordingly, the result of the determination is "N," and whether Pe can be generated from FK24 is determined (Step 59). In this case, since it is possible to simultaneously press the key with the note number 45 with the little finger and the key with the note number 52 with the index finger, it is determined that Pe can be generated from FK24, and fingering position information Pe at the end point time is FK24 (Step 60). FK24 in this case is synthetic key pressing information of FK2 and FK4 showing pressing of the key with the note number 45 with the little finger and pressing of the key with the note number 52 with the index finger.

The fingering position information Pm at the reproduction time T to be generated in Step 90 is obtained by synthesizing fingering position information Ps of the initial image and fingering position information Pe of FK24, and a fingering image to be drawn based on the fingering position information Pm is an in-motion image before pressing the key with the note number 45, showing a movement from the initial image (home position) to a chording hand position to press the keys with the note numbers 45 and 52.

In the state C where the reproduction time T is "192," in the scanning in Step 52 of the flowchart of FIG. 4, T1 is invalid, and since the reproduction time T is at a key pressing time, T2 is the "time 192" being a key pressing time before and closest to T, T3 is the "time 202," and T4 is the "time 216."

When the reproduction time T is "192," T=T2, and T<T2 is not satisfied, so that the result of the determination in Step 55 is "N." FK12 and FK24 have already been generated in Step 54.

At the time 192, key pressing is being performed (Step 63), and T4−T3=14<Tmin=96 (Step 64), and whether Ps and Pe can be generated from FK24 is determined (Step 65), and since it is possible to simultaneously press the key with the note number 45 with the little finger and the key with the note number 52 with the index finger as described above, it is determined that Ps and Pe can be generated from FK24, and fingering position information Ps at the start point time and fingering position information Pe at the end point time are FK24 (Step 66). FK24 in this case is synthetic key pressing information of FK2 and FK4 showing pressing of the key with the note number 45 with the little finger and pressing of the key with the note number 52 with the index finger.

The fingering position information Pm at the reproduction time T to be generated in Step 90 is fingering position information Ps (Pe) of FK24, and a fingering image to be drawn based on the fingering position information Pm is a fingering image by key pressing display showing that the key with the note number 45 is being pressed with a chording hand position capable of pressing the keys with the note numbers 45 and 52.

In the state D where the reproduction time T is "210," in the scanning in Step 52 of the flowchart of FIG. 4, T1 is the "time 202" corresponding to a key releasing time before and closest to T, and since the reproduction time T is at a key releasing time, T2 is the "time 216" being a key pressing time after and closest to T, T3 is the "time 226" being a key releasing time after and closest to T2, and T4 is the "time 216" being a key pressing time after and closest to T2.

When the reproduction time T is "210," T1 is present, so that the result of the determination in Step 55 is "N."

At the time 210, key releasing is being performed (Step 63), and the condition of Step 70 {although T4 is equal to T2, T (time 210) is not equal to or more than T2 (time 216)} is not satisfied, and the condition of Step 72 (T2−T1=14<Tmin=96) is satisfied, so that it is possible to simultaneously press the key with the note number 45 with the little finger and the key with the note number 52 with the index finger, and therefore, Ps is determined that it can be generated from FK12 (Step 73), and fingering position information Ps at the start point time is FK12 (Step 74). FK12 in this case is synthetic key pressing information of FK1 and FK2 showing pressing of the key with the note number 45 with the little finger and pressing of the key with the note number 52 with the index finger.

In addition, since it is possible to simultaneously press the key with the note number 52 with the index finger and the key with the note number 57 with the thumb, so that it is determined that Pe can be generated from FK24, and fingering position information Pe at the end point time is FK24 (Step 79). FK24 in this case is synthetic key pressing information of FK2 and FK4 showing pressing of the key with the note number 52 with the index finger and pressing of the key with the note number 57 with the thumb.

The fingering position information Pm at the reproduction time T to be generated in Step 90 is obtained by synthesizing fingering position information Ps of FK12 and fingering position information Pe of FK24, and a fingering image to be drawn from the fingering position information Pm is an in-motion image (after releasing the key with the note number 45 and before pressing the key with the note number 52) showing a movement from a chording hand position to press the keys with the note numbers 45 and 52 to a chording hand position to press the keys with the note numbers 52 and 27.

In the state E where the reproduction time T is "216," in the scanning in Step 52 of the flowchart of FIG. 4, T1 is the "time 202" corresponding to a key releasing time before and closest to T, and since the reproduction time T is at a key pressing time, T2 is the "time 216" being a key pressing time before and closest to T, T3 is the "time 226" being a key releasing time after and closest to T2, and T4 is the "time 240" being a key pressing time after and closest to T2.

When the reproduction time T is "216," T2 is the "time 202", and T<T2 is not satisfied, so that the result of the determination in Step 55 is "N."

At the time 216, key pressing is being performed (Step 63), and the condition of Step 64 (T4−T3=14<Tmin=96) is also satisfied, so that since it is possible to simultaneously press the key with the note number 52 with the index finger and the key with the note number 57 with the thumb, it is determined that Ps and Pe can be generated from FK24 (Step 65), and fingering position information Ps at the start point time and fingering position information Pe at the end point time are FK24 (Step 66). FK24 in this case is synthetic key pressing information of FK2 and FK4 showing pressing of the key with the note number 52 with the index finger and pressing of the key with the note number 57 with the thumb.

The fingering position information Pm at the reproduction time T to be generated in Step 90 is fingering position information Ps (Pe) of FK24, and a fingering image to be drawn based on the fingering position information Pm is a fingering image by key pressing display showing that the key with the note number 52 is being pressed with a chording hand position capable of pressing the keys with the note numbers 52 and 57.

In the state F where the reproduction time T is "234," in the scanning in Step 52 of the flowchart of FIG. 4, T1 is the "time 226" corresponding to a key releasing time before and closest to T, and since the reproduction time T is at a key releasing time, T2 is the "time 240" being a key pressing time after and closest to T, T3 is the "time 263" being a key releasing time after and closest to T2, and T4 is the "time 336" being a key pressing time after and closest to T2.

When the reproduction time T is "234," T1 is present, so that the result of the determination in Step 55 is "N."

At the time 234, key releasing is being performed (Step 63), and the condition of Step 70 is not satisfied {although T4 is equal to T2, T (time 234) is not equal to or more than T2 (time 240)}, and the condition of Step 72 (T2−T1=14<Tmin=96) is satisfied, so that whether Ps can be generated from FK12 is determined (step 73), and fingering position information Ps at the start point time is FK12 (Step 74). FK12 in this case is synthetic key pressing information of FK1 and FK2 showing pressing of the key with the note number 45 with the index finger and pressing of the key with the note number 57 with the thumb.

The condition of Step 77 (T4−T3=73<Tmin=96) is satisfied, the note number of the key pressed with the little finger at T2 is "40," and a chord consisting of the note number "40" and the note number "57" pressed at the time of key pressing with the thumb at T4 cannot be played with the same hand position, so that in Step 78, it is determined that Pe cannot be generated from FK24, and fingering position information Pe at the end point is FK2 (Step 80). FK2 in this case is key pressing information showing pressing of the key with the note number 57 with the thumb.

The fingering position information Pm at the reproduction time T to be generated in Step 90 is obtained by synthesizing fingering position information Ps of FK12 and fingering position information Pe of FK2, and a fingering image to be drawn based on the fingering position information Pm is an in-motion image (after releasing the key with the note number 52 and before pressing the key with the note number 57) showing a movement from a chording hand position to press the keys with the note numbers 52 and 57 to a single note playing hand position to press the key with the note number 57.

In the state G where the reproduction time T is "240," in the scanning in Step 52 of the flowchart of FIG. 4, T1 is the "time 226" corresponding to a key releasing time before and closest to T, and since the reproduction time T is at a key pressing time, T2 is the "time 240" being a key pressing time before and closest to T, T3 is the "time 263" being a key releasing time after and closest to T2, and T4 is the "time 336" being a key pressing time after and closest to T2.

When the reproduction time T is "240," T2 is the "time 240", and T<T2 is not satisfied, so that the result of the determination in Step 55 is "N."

At the time 240, key pressing is being performed (Step 63), and the condition of Step 64 (T4−T3=73<Tmin=96) is satisfied, so that whether Ps and Pe can be generated from FK24 is determined (Step 65). In Step 65, the note number of the key pressed with the little finger at T2 is "40," and a chord consisting of the note number "40" and the note number "57" pressed at the time of key pressing with the thumb at T4 cannot be played with the same hand position, so that it is determined that Pe cannot be generated from FK24, and fingering position information Ps at the start point time and fingering position information Pe at the end point time are FK2 (Step 68). FK2 in this case is key pressing information showing pressing of the key with the note number 57 with the thumb.

The fingering position information Pm at the reproduction time T to be generated in Step 90 is fingering position information Pe (Pe) of FK2, and a fingering image to be drawn based on the fingering position information Pm is a fingering image by key pressing display showing that the key with the note number 57 is being pressed with a single note playing hand position capable of pressing the key with the note number 57.

In the state H where the reproduction time T is "288," in the scanning in Step 52 of the flowchart of FIG. 4, T1 is the "time 263" corresponding to a key releasing time before and closest to T, and since the reproduction time T is at a key releasing time, T2 is the "time 336" being a key pressing time after and closest to T, T3 is the "time 346" being a key releasing time after and closest to T2, and T4 is the "time 360" being a key pressing time after and closest to T2.

When the reproduction time T is "288," T1 is present, so that the result of the determination in Step 55 is "N."

At the time 288, key releasing is being performed (Step 63), and the condition of Step 70 is not satisfied (T4>T2), and the condition of Step 72 (T2−T1=73<Tmin=96) is satisfied, and whether Ps can be generated from FK12 is determined (Step 73).

In Step 73, it is determined that Ps cannot be generated since key pressing positions of the fingers to be synthesized are distant, and fingering position information Ps at the start point time is FK1 (Step 76). FK1 in this case is key pressing information showing pressing of the key with the note number 57 with the thumb.

The condition of Step 77 (T4−T3=14<Tmin=96) is satisfied, and it is possible to simultaneously press the key with the note number 40 with the little finger and the key with the note number 52 with the thumb, so that it is determined that Ps and Pe can be generated from FK24 (Step 78), and fingering position information Pe at the end point time is FK24 (Step 79). FK24 in this case is synthetic key pressing information of FK2 and FK4 showing pressing of the key with the note number 40 with the little finger and pressing of the key with the note number 52 with the thumb.

The fingering position information Pm at the reproduction time T to be generated in Step 90 is obtained by synthesizing fingering position information Ps of FK1 and fingering position information Pe of FK24, and a fingering image to be drawn based on the fingering position information Pm is an in-motion image (after releasing the key with the note number 57 and before pressing the key with the note number 40) showing a movement from a single note playing hand position to press the key with the note number 57 to a chording hand position to press the keys with the note numbers 40 and 52.

In the state I where the reproduction time T is "336," in the scanning in Step 52 of the flowchart of FIG. 4, T1 is the "time 263" corresponding to a key releasing time before and closest to T, and since the reproduction time T is at a key pressing time, T2 is the "time 336" being a key pressing time before and closest to T, T3 is the "time 346" being a key releasing time after and closest to T2, and T4 is the "time 360" being a key pressing time after and closest to T2.

When the reproduction time T is "336," T2 is the "time 263", and T<T2 is not satisfied, so that the result of the determination in Step 55 is "N."

At the time 336, key pressing is being performed (Step 63), and the condition of Step 64 (T4−T3=14<Tmin=96) is satisfied, so that it is determined that Ps and Pe can be generated from FK24 (Step 65), and fingering position information Ps at the start point time and fingering position information Pe at the end point time are FK24 (Step 66). FK24 in this case is synthetic key pressing information of FK2 and FK4 showing pressing of the key with the note number 40 with the little finger and pressing of the key with the note number 52 with the index finger.

The fingering position information Pm at the reproduction time T to be generated in Step 90 is fingering position information Ps (Pe) of FK24, and a fingering image to be drawn based on the fingering position information Pm is a fingering image by key pressing display showing that the key with the note number 40 is being pressed with a chording hand position capable of pressing the keys with the note numbers 40 and 52.

In the state J where the reproduction time T is "354," in the scanning in Step 52 of the flowchart in FIG. 4, T1 is the "time 346" corresponding to a key releasing time before and closest to T, and since the reproduction time T is at a key releasing time, T2 is the "time 360" being a key pressing time after and closest to T, T3 is the "time 370" being a key releasing time after and closest to T2, and T4 is the "time 384" being a key pressing time after and closest to T2.

When the reproduction time T is "354," T1 is present, so that the result of the determination in Step 55 is "N."

At the time 354, key releasing is being performed (Step 63), and the condition of Step 70 is not satisfied (T4>T2), the condition of Step 72 is satisfied (T2−T1=14<Tmin=96), and Ps is determined that it can be generated from FK12 (Step 73), and fingering position information Ps at the start point time is FK12 (Step 74). FK12 in this case is synthetic key pressing information of FK1 and FK2 showing pressing of the key with the note number 40 with the little finger and pressing of the key with the note number 52 with the thumb.

The condition of Step 77 is satisfied (T4−T3=10<Tmin=96), and Pe can be generated from FK24, so that fingering position information Pe at the end point time is FK24 (Step 79). FK24 in this case is synthetic key pressing information of FK2 and FK4 showing pressing of the key with the note number 52 with the thumb.

The fingering position information Pm at the reproduction time T to be generated in Step 90 is obtained by synthesizing fingering position information Ps of FK12 and fingering position information Pe of FK24, and a fingering image to be drawn based on the fingering position information Pm is an in-motion image (after releasing the key with the note number 40 and before pressing the key with the note number 52) showing a movement from a chording hand position to press the keys with the note numbers 40 and 52 to a single note playing hand position to press only the key with the note number 52.

The respective states K to U show, like the states A to J, fingering images obtained through the processing in the flowchart of FIG. 4, and the fingering images corresponding to the respective states are displayed as follows.

State K: The key with the note number 52 is being pressed with a single note playing hand position to press the key with the note number 52.

State L: In motion after releasing the key with the note number 52 and before pressing the key with the note number 56, the hand position changes from a single note playing hand position to press the key with the note number 52 into a single note playing hand position to press the key with the note number 56 (crossing over).

State M: The key with the note number 56 is being pressed with a single note playing hand position to press the key with the note number 56 (crossing over).

State N: In motion after releasing the key with the note number 56 and before pressing the key with the note number 45, the hand position changes from the single note playing hand position to press the key with the note number 56 into a chording hand position to press the keys with the note numbers 45 and 52.

State O: The key with the note number 45 is being pressed with a chording hand position to press the keys with the note numbers 45 and 52.

State P: In motion after releasing the key with the note number 45 and before pressing the key with the note number 52, the hand position changes from the chording hand position to press the keys with the note numbers 45 and 52 into a chording hand position to press the keys with the note numbers 52 and 57.

State Q: The key with the note number 52 is being pressed with the chording hand position to press the keys with the note numbers 52 and 57.

State R: In motion after releasing the key with the note number 52 and before pressing the key with the note number 57, the hand position changes from the chording hand position to press the keys with the note numbers 52 and 57 into a single note playing hand position to press the key with the note number 57.

State S: The key with the note number 57 is being pressed with the single note playing hand position to press the key with the note number 57.

State T: After releasing the key with the note number 57 and before pressing the key with the note number 45, the hand position changes from the single note playing hand position to press the key with the note number 57 into a chording hand position to press the keys with the note numbers 45 and 52.

State U: The key with the note number 45 is being pressed with the chording hand position to press the keys with the note numbers 45 and 52.

In the state L and the state M, a fingering image is displayed so that fingering for "crossing over" being special fingering is understood. The presence of special fingering is judged according to setting of a flag showing which operation among the "finger change," "crossing under," and "crossing over" is included.

For generation of a special fingering image, in the processing of Step 62 in FIG. 4, key pressing information is generated from musical score information, and taken in the key pressing information correction processing of Step 67 and accordingly, a fingering image is displayed.

According to the above-described fingering display device and fingering display program, in a case where a fingering moving image of playing a musical instrument is drawn in a musical piece reproduction based on playing information including respective musical sounds of a musical piece and corresponding finger numbers so as to perform fingering display on the screen, when generating a fingering drawing based on fingering position information Pm corresponding to a reproduction time T in a musical piece reproduction, the fingering drawing is generated based on synthetic key pressing information obtained by synthesizing fingering position information Ps at a time before the reproduction time T and fingering position information Pe at a time after the reproduction time T.

As a result, by including previous and next finger position information in movements of the back of the hand and the fingers, a moving distance of the back of the hand can be minimized and a fingering moving image close to an actual keyboard operation can be drawn.

Figure 10:
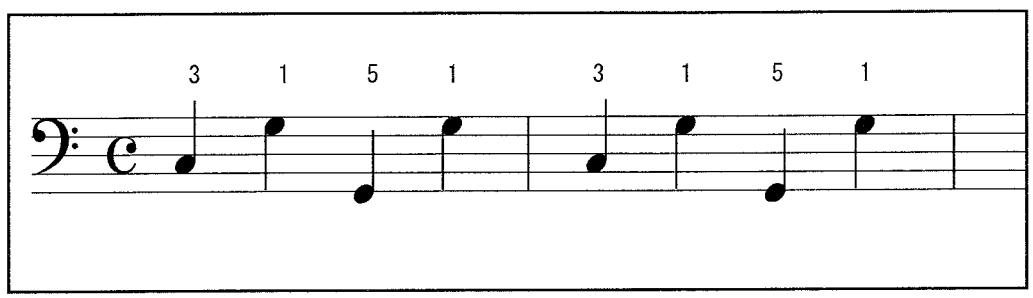
FIG. 10 is a view showing an example of a musical score.
Figure 11:
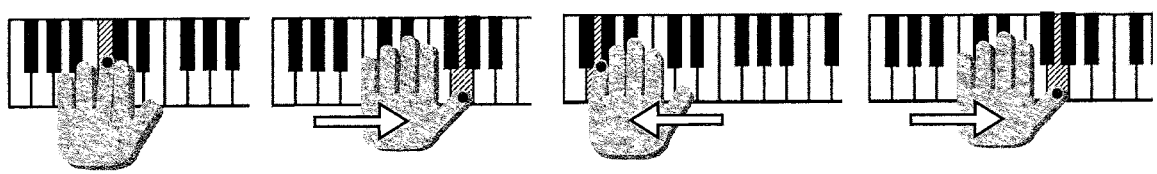
FIG. 11 is an explanatory view showing an example of fingering display according to a conventional example with respect to the musical score shown in FIG. 10.
Figure 12:
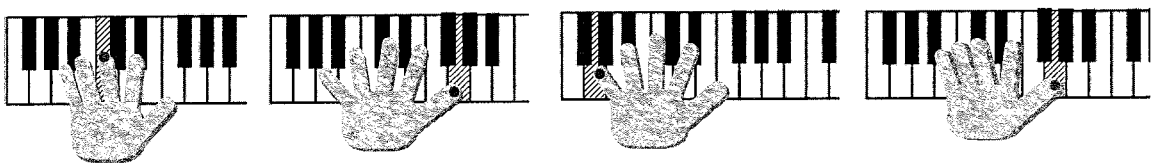
FIG. 12 is an explanatory view showing an example of fingering display according to the present invention with respect to the musical score shown in FIG. 10.
Figure 13:
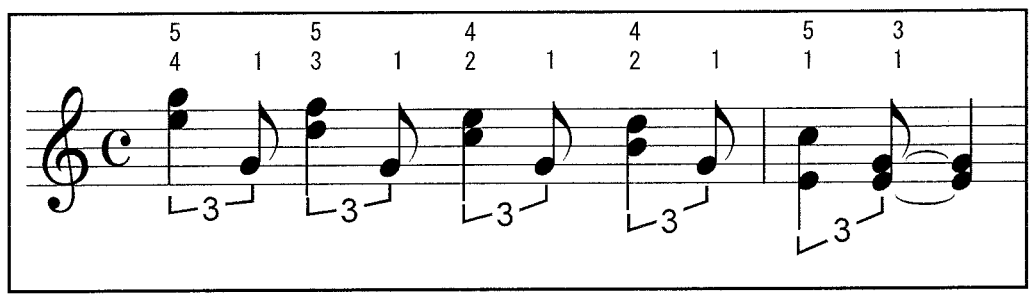
FIG. 13 is a view showing an example of a musical score.
Figure 14:
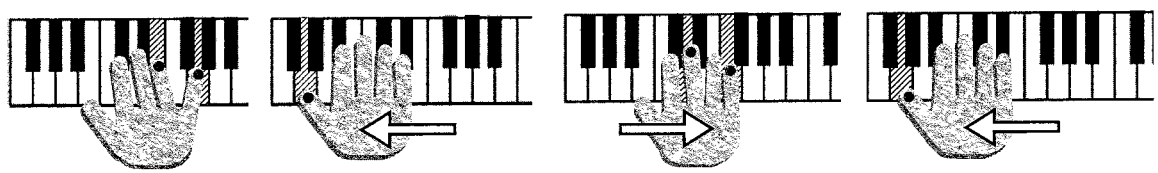
FIG. 14 is an explanatory view showing an example of fingering display according to a conventional example with respect to the musical score shown in FIG. 13.
Figure 15:
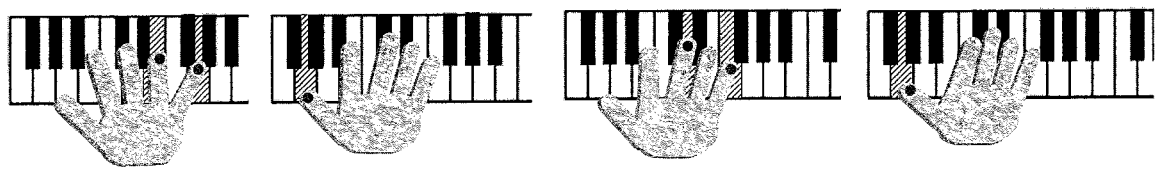
FIG. 15 is an explanatory view showing an example of fingering display according to the present invention with respect to the musical score shown in FIG. 13.

For example, with respect to the musical scores shown in FIG. 10 and FIG. 13, the fingering images shown in FIG. 11 and FIG. 14 according to fingering display of the conventional example can be changed into fingering images shown in FIG. 12 and FIG. 15 according to fingering display of the present invention, and a moving distance of the back of the hand can be minimized, and a fingering moving image close to an actual keyboard operation can be drawn.

For example, when D# and E at the beginning of the right hand part of "For Elise" in FIG. 6 are alternately played with the little finger and the ring finger, although the back of the hand makes a small leftward/rightward movement each time of playing one note in the conventional method, the present invention brings about an effect in which the back of the hand keeps the chording hand position with the little finger playing D# and the ring finger playing E and does not make a leftward/rightward movement, and therefore, a quite natural fingering moving image is obtained.

In another fingering display program of the present invention, when generating a fingering moving image, if a time period from key releasing to the next key pressing is long, a fingering image is preceded in a short elapsed time after key releasing to prevent unnatural motions of the fingering image.

In the case of the musical score shown in FIG. 6, in playing with the left hand, a sixteenth rest and an eighth rest are present in measure 5, and a whole rest is present in measure 6, so that during these, the left hand does not press any key. The piano roll shown in FIG. 7 corresponding to the musical score of this part is turned into the state T at the "time 588."

In the state T where the reproduction time T is "588," in the scanning in Step 52 of the flowchart of FIG. 4, T1 is the "time 551" corresponding to a key releasing time before and closest to T, and since the reproduction time T is at a key releasing time, T2 is the "time 768" being a key pressing time after and closest to T, T3 is the "time 778" being a key releasing time after and closest to T2, and T4 is the "time 792" being a key pressing time after and closest to T2.

When the reproduction time T is "588," T1 is present, so that the result of the determination in Step 55 is "N."

Whether to make a preceding movement is determined by performing processing of Step 70, Step 72, and Step 75 in the flowchart of FIG. 4 in order. That is, whether it is after the last key pressing is determined in Step 70, whether a time period to the next key pressing is shorter than a predetermined time period is determined in Step 72, and whether to make a preceding movement is determined in Step 75.

For example, in the case of the time 588, key releasing is being performed (Step 63), the condition of Step 70 is not satisfied (T=588 is not equal to or more than T2=768), and the condition of Step 72 is not satisfied (T2−T1=768−588=180 is larger than Tmin of 96).

In the case of the time 588, the condition of Step 75 is satisfied (T−T1=588−551=37 is smaller than Tmin of 96), so that a preceding movement is determined to be made. Since the time period from T1 to T2 is longer than Tmin, key pressing at T1 and key pressing at T2 cannot be synthesized, and therefore, fingering position information Ps at the start point time is not FK12 but FK1 (Step 76). FK1 in this case is FK1 key pressing information showing pressing of the key with the note number 57 with the thumb.

Subsequently, the condition of Step 77 is determined, and T4−T3=792−778=14 is smaller than Tmin of 96, so that the result of the determination is "Y," and Pe can be generated from FK24 (Step 78), and therefore, fingering position information Pe at the end point is FK24 (Step 79). FK24 in this case is synthetic key pressing information of FK2 and FK4 showing pressing of the key with the note number 52 with the index finger and pressing of the key with the note number 45 with the little finger.

The fingering position information Pm at the reproduction time T to be generated in Step 90 is obtained by synthesizing the fingering position information Ps of FK1 and fingering position information Pe of FK24, and a fingering image to be drawn based on the fingering position information Pm is an in-motion image (in motion after releasing the key with the note number 57 and before pressing the key with the note number 45) showing a movement from a single note playing hand position to press the key with the note number 57 to a chording hand position to press the keys with the note numbers 45 and 52.

The preceding movement end point time is the time 647 that is Tmin (96) after the start point time 551 (T1).

Next, drawing of a fingering image with a preceding movement is described with reference to FIG. 2, FIG. 16, and FIGS. 17A-B.

The musical score shown in FIG. 2 shows enlarged measures 5 and 6 of the musical score shown in FIG. 6, and a key pressing image showing the key of "A" pressed with the thumb, as the last musical sound in measure 5 for the left hand is displayed from the position of BAR in the musical score. Thereafter, even when playing progresses, key pressing with the left hand rests until the note of "A" in measure 7.

Figure 16:
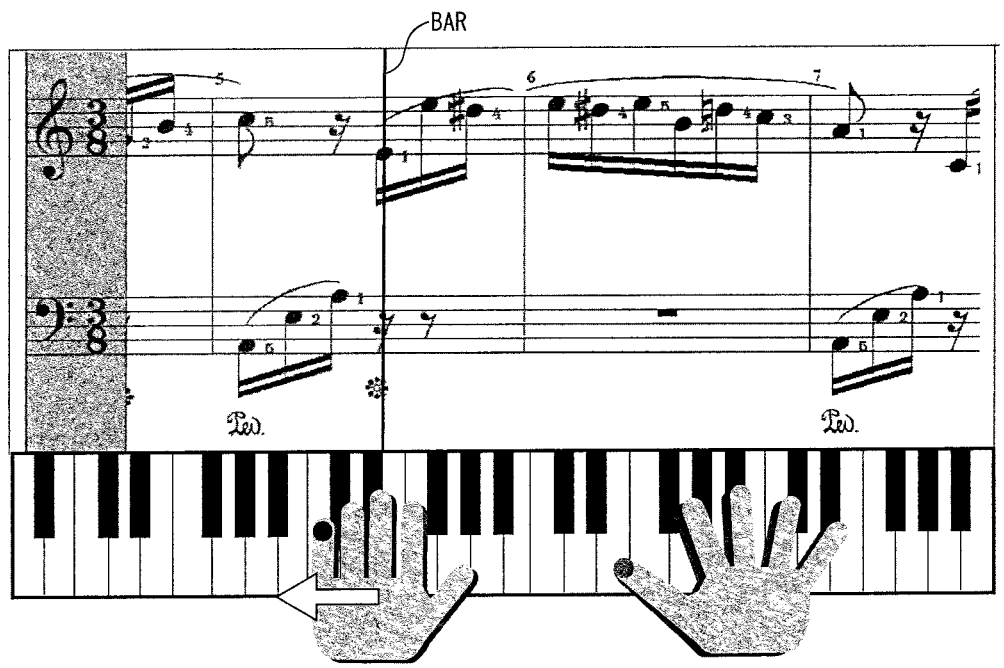
FIG. 16 shows a display example (conventional method) of a fingering image to be drawn with respect to a musical score and a keyboard.

In this case, in the case of conventional drawing of a key pressing image, as shown in FIG. 16, the key pressing image moves leftward according to the progress of BAR, and takes as long as one and a half measures to slowly move to the position of pressing the key of "A" with the little finger just after measure 7 starts.

On the other hand, according to the above-described fingering drawing method, when generating a key pressing image, a time T2 being a key pressing time after and closest to the reproduction time T from a key releasing time when key pressing changes to key releasing at the reproduction time T, and a time T1 just before changing to key pressing information at time T2, are obtained, and when a time period from the time T1 to the time T2 is longer than a desired time, whether an elapsed time from the time T1 to the reproduction time T is short is further determined, and when it is short, based on synthetic key pressing information obtained by synthesizing key pressing information at time T2, end-point fingering position information (Pe) is obtained by defining an end point time as T1+Tmin, and fingering position information (Pm) is generated.

Figure 17A:
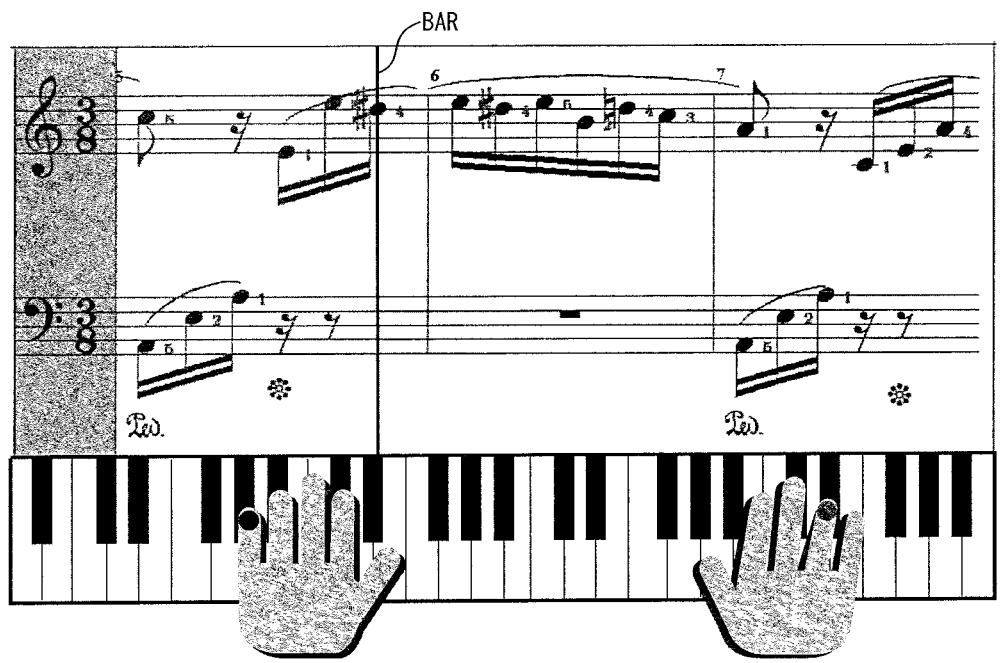
FIG. 17A shows a display example (method of the present invention) of a fingering image by preceding movement to be drawn with respect to a musical score and a keyboard.
Figure 17B:
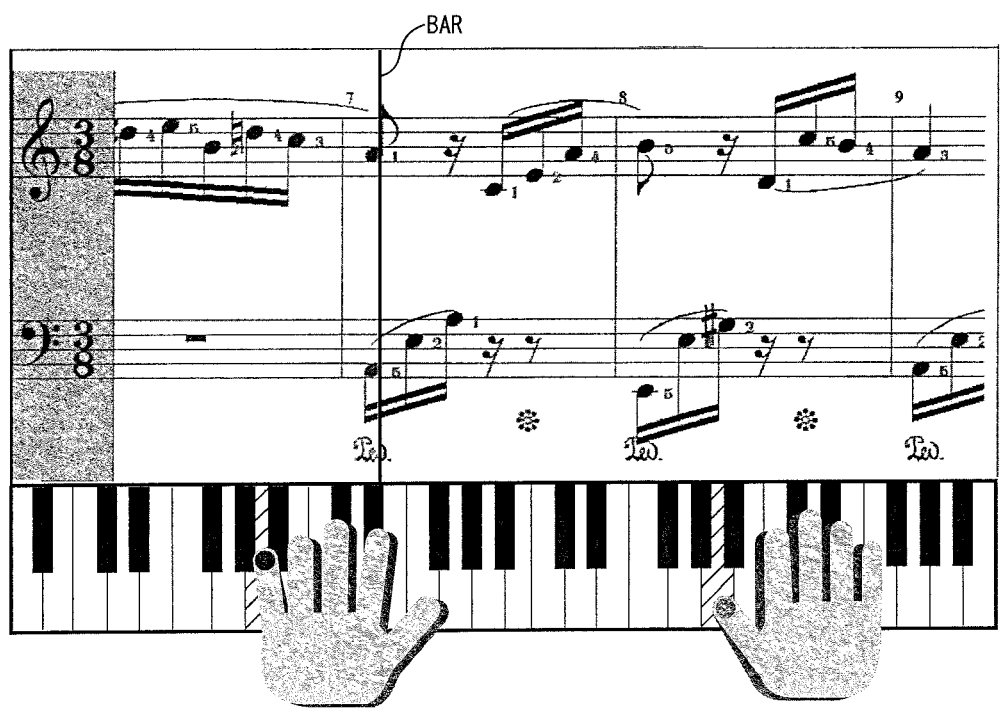
FIG. 17B shows a display example (method of the present invention) of a fingering image by preceding movement to be drawn with respect to a musical score and a keyboard.

Therefore, as shown in FIG. 17A, while BAR still moves along measure 5, the left hand key pressing image can be made to make a preceding movement to a position enabling it to press the key of "A" in measure 7. When BAR reaches the first note in measure 7 in actuality, the key pressing image as shown in FIG. 17B is displayed. That is, at the reproduction time T in FIG. 17A, the key pressing image can be moved in advance in a short time to the position of the key as a key pressing target in FIG. 17B.

According to the above-described key pressing image drawing method (fingering display program), in a case where a fingering moving image of playing a musical instrument is drawn a in musical piece reproduction based on playing information including the respective musical sounds of a musical piece and corresponding finger numbers so as to perform fingering display on the screen, when generating a fingering drawing based on fingering position information Pm corresponding to the reproduction time T in the musical piece reproduction, a fingering drawing is generated based on synthetic key pressing information obtained by synthesizing fingering position information Ps at a time before the reproduction time T and fingering position information Pe at a time after the reproduction time T.

By determining the time period from key releasing to the next key pressing, even if the time period is long, a fingering image can be generated so that hand movement completes as early as possible before the next key pressing time comes. Accordingly, a practicing person can be instructed to quickly prepare his/her hand and fingers for the next key pressing.

Next, a fingering image with an offset image to be displayed on the fingering display device described above is described with reference to FIG. 18 to FIG. 21.

A fingering image with an offset image at a reproduction time T is generated in the fingering image generation unit 15 based on information (position information of a key pressing fingering image, and position information of a key releasing fingering image), etc., prepared in the fingering position information generation unit 14.

The above-described fingering position information Pm generated in the fingering position information generation unit 14 includes position information of a key pressing fingering image at the time of key pressing at the reproduction time, and position information of a key releasing fingering image when the key pressing finger is released from the key pressing fingering image.

The fingering image with an offset image is generated by simultaneously displaying either a key pressing fingering image and a fingering shadow image or a key releasing fingering image and a fingering shadow image with respect to the fingering shadow image having the same shape as that of the key releasing fingering image when maximally offset based on information on a hand shape and coordinates of finger positions corresponding to the fingering position information.

Figure 18:
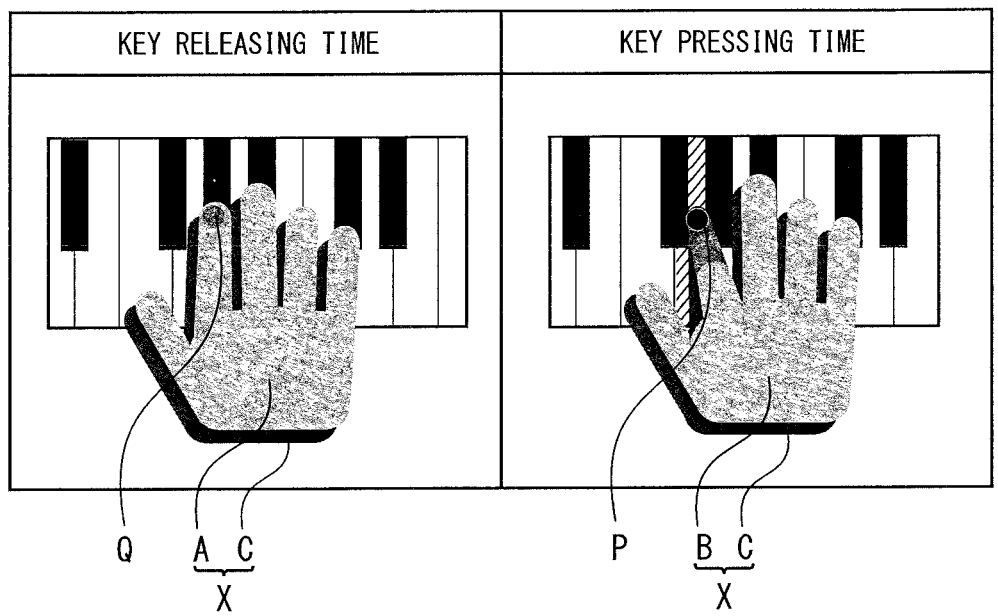
FIG. 18 is an image view showing a fingering image with an offset image at the time of key releasing and a fingering image with an offset image at the time of key pressing in the case of pressing a key of a single note.
Figure 20:
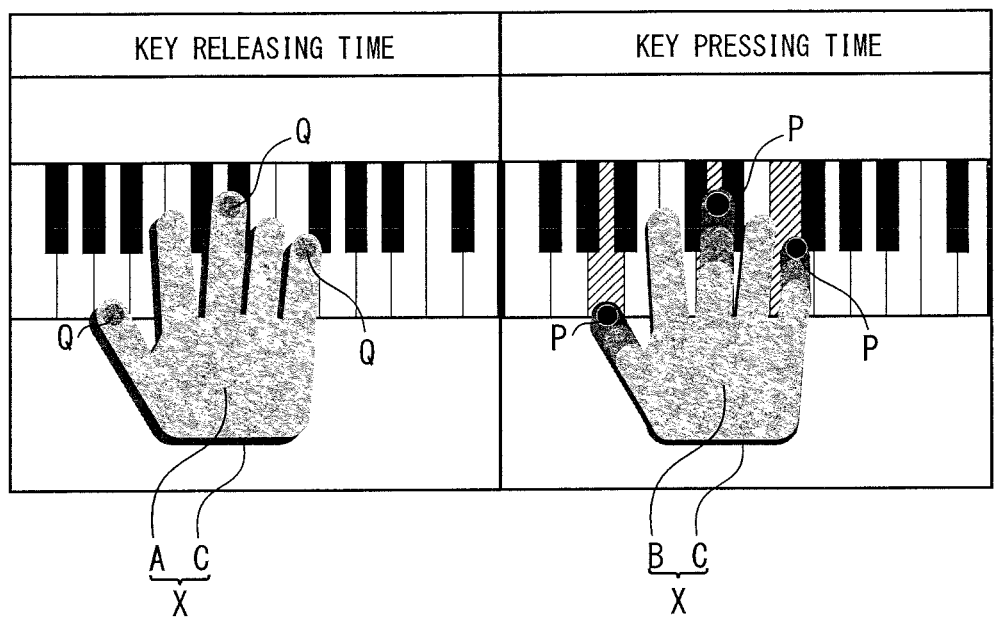
FIG. 20 is an image view showing a fingering image with an offset image at the time of key releasing and a fingering image with an offset image at the time of key pressing in the case of pressing keys of a chord.

In the fingering image X with an offset image, as shown in each of FIG. 18 and FIG. 20, two kinds of fingering images are offset from each other and superimposed one on the other and displayed at the reproduction time.

FIG. 18 shows a fingering image X with an offset image at the time of key pressing when pressing a single note of G on the keyboard with the index finger of the right hand, and a fingering image X with an offset image at the time of key releasing just before key pressing.

FIG. 20 shows a fingering image X with an offset image at the time of key pressing when pressing keys to play a chord consisting of A, D, and F with the thumb, the middle finger, and the little finger of the right hand, and a fingering image X with an offset image at the time of key releasing just before key pressing.

Each fingering image consists of the positions and shapes of the back of the hand and the respective fingers at a current reproduction time according to a secondary fingering display method using geometric shapes of the back of the hand and the respective fingers.

Figure 19:
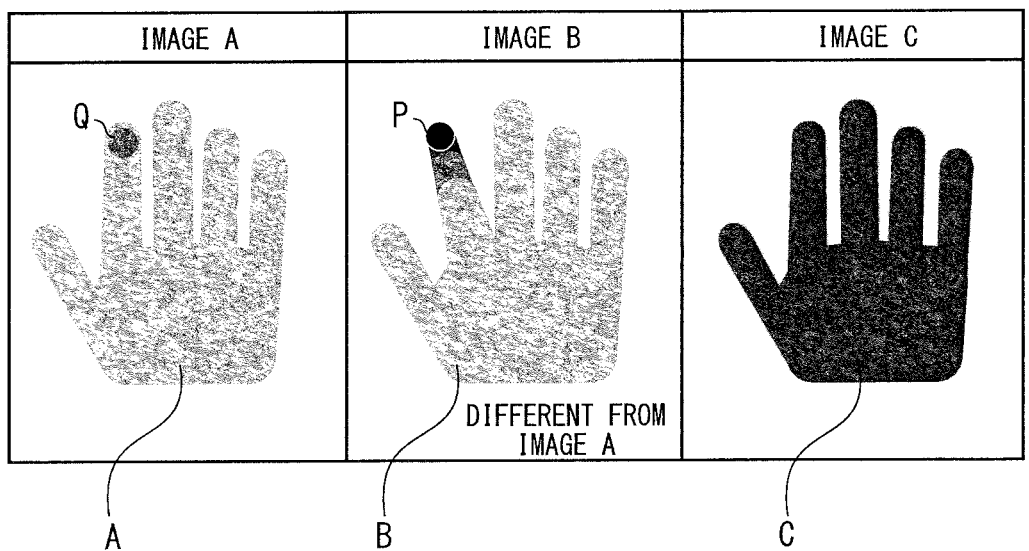
FIG. 19 is an image view showing a key releasing fingering image (image A), a key pressing fingering image (image B), and a fingering shadow image (image C) for generating the fingering images with offset images shown in FIG. 18.

Each of the fingering images (at the times of key pressing and key releasing) X with offset images when pressing a key of a single note, shown in FIG. 18, are generated based on a key releasing fingering image (image A), a key pressing fingering image (image B), and a key pressing fingering shadow image (image C) shown in FIG. 19.

The image A and the image B are different only in shape of a finger portion pressing a key. That is, in the case of a single note, only the key pressing finger moves up/down, and other fingers and the hand do not move up/down, so that the image A and the image B are different in shape except when maximally offset. By forming the image B into a different shape in which only a tip position of the key pressing finger when pressing a single note key matches the tip position in the image C, key pressing display that is also natural in appearance is enabled.

As color tones of the image A and the image B, light colors such as flesh color are preferable. Preferably, as a color tone of the image C, a dark color such as black is used so that it is recognized as a drop shadow of the image A, and the image C is transparently displayed so as to make the keyboard under the image visible.

At the time of key pressing, an under-key-pressing mark P is displayed near the tip of a finger pressing a key.

At the time of key pressing, by displaying the finger pressing a key so that its color tone becomes darker toward the tip of the finger, the finger looks as if it presses a key.

At the time of key releasing, a key pressing preparation mark Q is displayed near the tip of a finger that will press a key next.

In the fingering image X with an offset image at the time of key releasing (just before key pressing), the image A offset with respect to the image C is displayed at an upper side of the image C. The image A indicates a position of a finger that will press a key next by the key pressing preparation mark Q, and is displayed at an offset position corresponding to a sound volume of a musical sound of a key to be pressed next, and accordingly, a magnitude of a sound volume at the time of key pressing can be visually instructed.

At this time, according to a remaining time before the next key pressing, the offset of the tip position of the finger pressing a key is changed so as to gradually decrease and reach zero at the time of key pressing (that is, the tip position of the finger pressing a key in the image C and the tip position of the finger pressing a key in the image A match each other).

In the fingering image X with an offset image at the time of single note key pressing, the image B offset with respect to the image C is displayed at an upper side of the image C. Preferably, the offset of the image B with respect to the image C is set to be substantially equivalent to and slightly smaller than that at the time of key releasing. This is for more easy recognition of key pressing.

Figure 21:
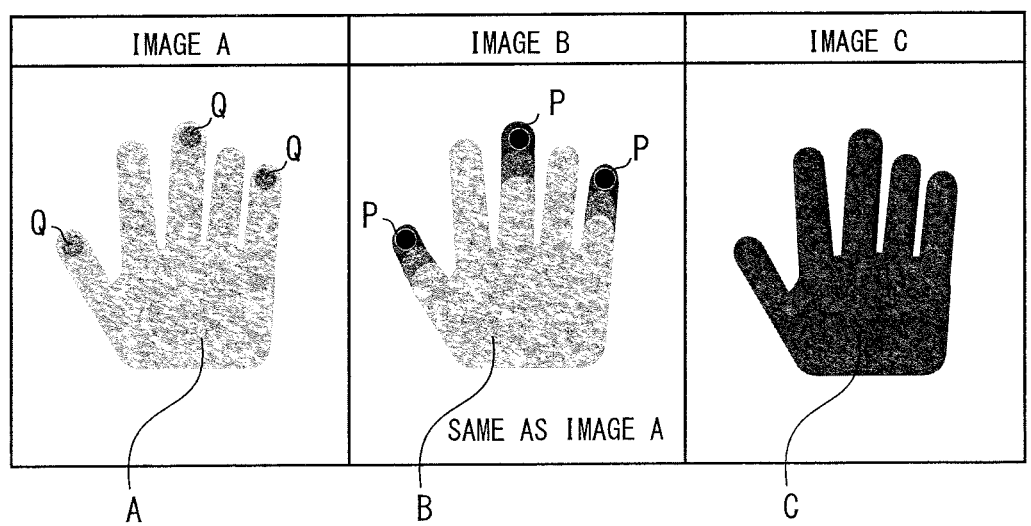
FIG. 21 is an image view showing a key releasing fingering image (image A), a key pressing fingering image (image B), and a fingering shadow image (image C) for generating the fingering images with offset images shown in FIG. 20.

Each of the fingering images (at the times of key pressing and key releasing) in the case of chording in FIG. 20 is also generated in the same manner as in the case of a single note, based on the key releasing fingering image (image A), the key pressing fingering image (image B), and the fingering shadow image (image C) shown in FIG. 21. The image A and the image B have the same shape unlike in the case of a single note. That is, in the case of chording, fingering in which the back of the hand and all fingers are moved integrally is performed, so that the image A and the image B have the same shape.

In the fingering image X with an offset image at the time of chord key releasing (just before key pressing), the image A offset and superimposed on the image C is displayed. The image A indicates positions of fingers that will press keys next, and is displayed at an offset position corresponding to a sound volume of musical sounds in the case of key pressing, and accordingly, a magnitude of the sound volume at the time of key pressing can be visually instructed.

At this time, according to a remaining time before the next key pressing, the offset is changed so as to gradually decrease and become minimum at the time of key pressing (that is, reach an offset at the time of key pressing).

Key pressing marks for key pressing fingers and color tones of key pressing fingers during chord key pressing, key pressing preparation marks for the next key pressing fingers at the time of chord key releasing, and color tones of the respective images are the same as in the case of a single note.

In the fingering image at the time of key pressing, the image B offset with respect to the image C is displayed at an upper side of the image C. An offset of the image B with respect to the image C is at a very small value. This offset is set to a value set in advance (may be equal to or different from that in the case of a single note). Setting the offset not to zero is in order to make easily viewable the fingers on the keyboard.

In the fingering images at the time of key pressing shown in FIG. 18 and FIG. 20 (the image B in FIG. 19 and the image B in FIG. 21), to express the key pressing finger (the index finger in FIG. 18 and FIG. 19, and the thumb, the middle finger, and the little finger in FIG. 20 and FIG. 21) as if the finger is flexed at a joint, the color tone changes in two stages at the joint portion, and becomes darker toward the tip side.

Figure 22:
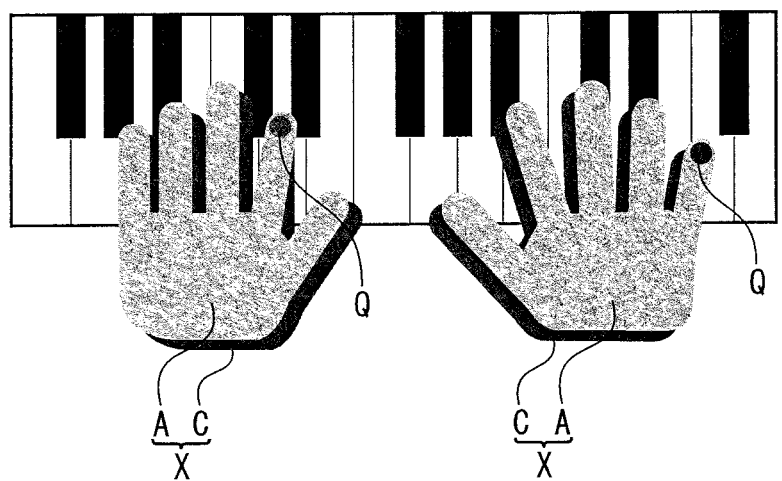
FIG. 22 is an image view when displaying fingering images for both left and right hands.

An offset direction of the image A with respect to the image C in the fingering image X with an offset image at the time of key releasing looks natural when it is a direction toward an upper left side for the left hand, and a direction toward an upper right side for the right hand as shown in FIG. 22, however, it is not limited to these, and may be other offset directions.

Figure 23A:
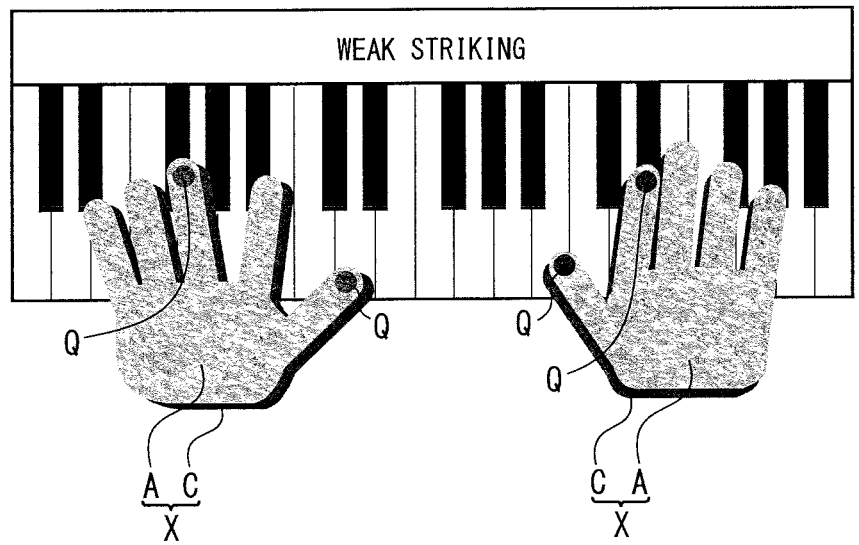
FIG. 23A is a view showing a fingering image when pressing (weakly striking) keys of a chord.
Figure 23B:
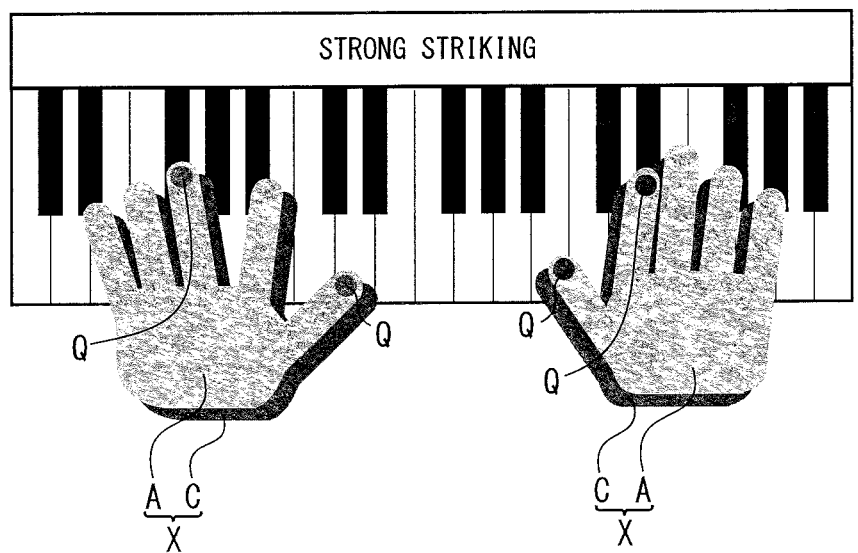
FIG. 23B is a view showing a fingering image when pressing (strongly striking) keys of a chord.

As shown in FIG. 23A and FIG. 23B, by making larger the offset as the sound volume is increased, it is possible to more easily visually transmit strong striking and weak striking. That is, by increasing the displacement of the image A with respect to the image C by making larger a maximum offset at the time of key releasing in the case of strong striking shown in FIG. 23B than in the case of weak striking shown in FIG. 23A, it is possible to perform display that enables a player to intuitively understand that for a higher sound volume responding to key pressing, the hand needs to be moved down from a higher position.

Figure 24:
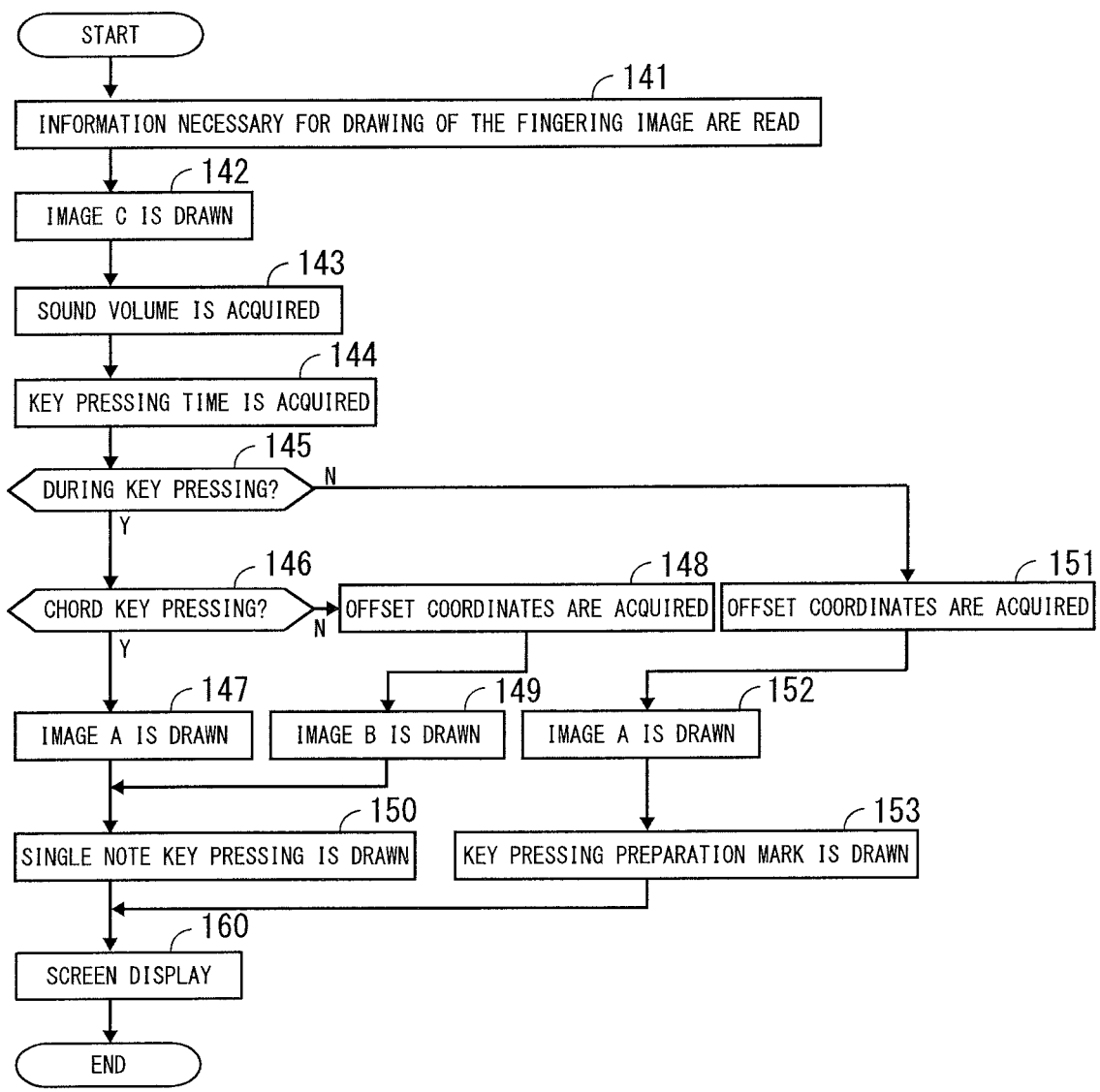
FIG. 24 is a flowchart for generation of a fingering image with an offset image in the fingering display program of the present invention.

Next, steps of generating fingering images with offset images from fingering position information in the fingering position information generation unit 14 and the fingering image generation unit 15 shown in FIG. 1 are described with reference to the flowchart of FIG. 24.

In the fingering display device, by the stored fingering display program, fingering position information for drawing an image A, an image B, and an image C based on key pressing information at a reproduction time are generated, and based on these fingering position information, a fingering image with an offset image is generated and drawn on the display device 18. The key pressing information also includes information on the sound volume.

First, information on shapes of the respective fingers and the back of the hand, including a relative length of the back of the hand with respect to a keyboard width, and relative positions of the respective fingers from the back of the hand, a key pressing time period, and a sound volume value, etc., necessary for drawing of the fingering image X are read (Step 141).

Next, fingering position information for drawing an image C is prepared from the key pressing information of Step 141 (Step 142). A display color of the image C is set to a dark color.

A sound volume value is acquired at the time of key pressing and a sound volume value for the next key pressing is acquired at the time of key releasing (Step 143), and a key pressing time is acquired in advance (Step 144).

Whether the reproduction time is during key pressing is determined (Step 145). When it is during key pressing, whether chord key pressing is being performed is determined (Step 146). Then, when chord key pressing is being performed, fingering position information for drawing an image A is prepared from the key pressing information, and the image A is drawn (Step 147). In the case of chording, the image A has the same shape as the image C (the back of the hand and the fingers have the same shapes), however, its display color is a light color, and key pressing fingers are displayed in a darker color tone than key releasing fingers.

When chord key pressing is not performed (that is, when single note key pressing is being performed), offset coordinates corresponding to the sound volume value are acquired (Step 148), fingering position information for drawing an image B is prepared from the key pressing information, and the image B is drawn at the offset position (Step 149).

The image B has a shape partially different from the shape of the image C (different in key pressing finger position), and a display color is the same light color as that of the image A. A key pressing finger is displayed in a darker color tone than a key releasing finger.

Under-key-pressing marks are drawn at key pressing finger positions in the image A in which chord key pressing is performed and the image B in which single note key pressing is performed (Step 150), and the image A is superimposed and displayed on the image C (Step 160). That is, at the time of single note key pressing, the fingering image X with an offset image shown in FIG. 18 is displayed, and at the time of chord key pressing, the fingering image X with an offset image shown in FIG. 20 is displayed.

In these cases, the image A or the image B is displayed at a position whose coordinates are offset with respect to the image C, and concerning this position, in the case of drawing a fingering image for the right hand, the image A or the image B is displayed so as to be displaced to an upper right position with respect to the image C. An offset at the time of key releasing gradually decreases according to a remaining time before the next key pressing, and reaches a minimum offset at the time of key pressing.

The under-key-pressing mark P is displayed as, for example, a circle at a tip of a key pressing finger.

When the reproduction time is not during key pressing (that is, a key releasing time) in Step 145, offset coordinates corresponding to a sound volume value for the next key pressing are acquired (Step 151), fingering position information for drawing the image A is prepared from key pressing information (single note/chord), and the image A is drawn (Step 152).

The image A when a key to be pressed next is a key of a chord is an image having the same shape (the back of the hand and fingers have the same shapes) as the image C. On the other hand, the image A when a key to be pressed next is a key of a single note is, when maximally offset, an image having the same shape as the image C, and gradually shifts into the shape of the image B according to a remaining time before the key pressing. The image A is displayed in a light color, and a key pressing finger is displayed in a darker color tone than a key releasing finger.

A key pressing preparation mark (single note or chord) is drawn at a next key pressing finger position in the image A at the time of key releasing (Step 153), and the image A is superimposed and displayed on the image C (Step 160). That is, when a key to be pressed next is a key of a single note, the key releasing fingering image shown in FIG. 18 is displayed, and when a key to be pressed next is a key of a chord, the key releasing fingering image shown in FIG. 20 is displayed.

In these cases, the image A is displayed at the offset position (offset coordinates) acquired in Step 151 with respect to the image C, and concerning this position, in a case of drawing a fingering image for the right hand, the image A is displayed so as to be displaced to an upper right position with respect to the image C. Conversely, in a case of drawing a fingering image for the left hand, the image A is displayed so as to be displaced to an upper left position with respect to the image C.

The key pressing preparation mark Q is displayed as, for example, a circle at a tip of a finger intending to press a key in a color distinguishable from the under-key-pressing mark. In place of the circle, a shape distinguishable from the under-key-pressing mark may be displayed.

According to the above-described fingering display device and fingering display program, at the time of musical sound reproduction, through simple fingering display, a change in sound volume from weak striking to strong striking can be visually shown to a practicing person. This is effective for sensing the dynamics of the musical piece, being an important artistic expression of music, through eyes as well.

By visually expressing up-down movements of the hand and fingers, a key pressing timing from key releasing can be more effectively shown than in the case where only the color of a key to be pressed is changed. In particular, when fingering display is for a single note, display in which only a finger to press a key moves is natural and easily understandable.

Further, a finger that should press a key currently is indicated with an under-key-pressing mark P, and a finger that will press a key next is also indicated with a key pressing preparation mark Q, so that pre-reading of fingering can be enabled.

The above-described example shows a fingering image having a simple two-dimensional geometric shape, however, without limiting to this, a fingering image or a fingering shadow image obtained by attaching a texture image to a polygon by rendering processing after polygon three-dimensional model coordinates are converted into screen coordinates based on polygon data on the back of the hand and fingers positioned in a three-dimensional coordinate system, may also be used.

Subsequently, respective fingering images for the left hand and the right hand to be displayed on the above-described fingering display device are described with reference to FIG. 25 and FIGS. 26A-H.

Figure 25:
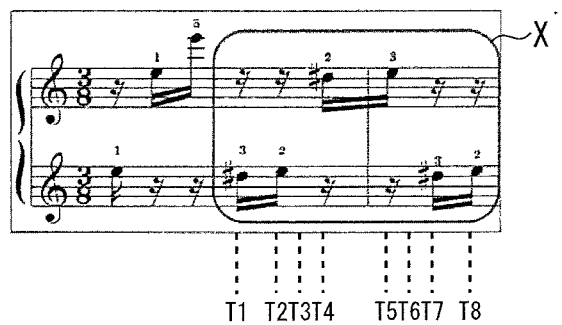
FIG. 25 shows an example of a musical score including a part in which the left hand and the right hand alternately strike keys.

FIG. 25 shows a part of the musical score of "For Elise" being a musical piece including a part in which the left hand and the right hand alternately press keys, and fingering images for the left hand and the right hand are described by using musical sounds displayed in the part X including the upper stave being a right hand playing part, and the lower stave being a left hand playing part. The numeral displayed above each note is a finger number to indicate which finger presses the key, and "1" corresponds to the thumb, "2" corresponds to the index finger, "3" corresponds to the middle finger, "4" corresponds to the ring finger, and "5" corresponds to the little finger.

In the musical score of the part X shown in FIG. 25, the key of "D#" is pressed with the middle finger (3) of the left hand (reproduction time T1), the key of "E" is pressed with the index finger (2) of the left hand (reproduction time T2), and then, the key of "D#" is pressed with the index finger (2) of the right hand (reproduction time T4), the key of "E" is pressed with the middle finger (3) of the right hand (reproduction time T5), and then, the key of "D#" is pressed with the middle finger (3) of the left hand (reproduction time T7), and the key of "E" is pressed with the index finger (2) of the left hand (reproduction time T8).

That is, when one hand presses a key, the other hand is at rest (rest state), so that the left hand and the right hand alternately press similar keys of "D#" and "E."

In such a musical score, when generating fingering images for the left hand and the right hand based on fingering position information corresponding to the reproduction time in a musical piece reproduction, if the fingering images for the left hand and the right hand overlap, among keys of musical sounds to be pressed at a current reproduction position, a hand corresponding to a musical sound whose sound production starting time is the latest is drawn foremost.

When there is no musical sound as a key pressing target at the current reproduction position and neither of the hands presses a key, a hand including a finger that will press a key next is drawn foremost.

Therefore, as fingering images for the left and right hands at the reproduction time T, as shown in order in FIG. 26A to FIG. 26H, fingering images in which the left hand and the right hand overlap each other are drawn in chronological order (reproduction times T1 to T8).

At the time of key pressing, an under-key-pressing mark P is displayed at a corresponding fingertip, and a pressed key portion is changed in color (hatched portion). At the time of preparation for key pressing, a key pressing preparation mark Q showing next key pressing is displayed at a corresponding fingertip.

In the fingering image at the reproduction time T1 in FIG. 26A, a time of key pressing with the left hand is shown, so that the left hand is drawn foremost. In the fingering image for the left hand, the key of "D#" is pressed with the middle finger (3), and the key is changed in color. There is a rest for the right hand at the reproduction time T1, so that the right hand is displayed in a state where the index finger (2) that will press a key at the next key pressing time (reproduction time T4) is indicated with a key pressing preparation mark Q.

In the fingering image at the reproduction time T2 in FIG. 26B, like at the reproduction time T1, a time of key pressing with the left hand is shown, so that the left hand is drawn foremost. In the fingering image for the left hand, the key of "E" is pressed with the index finger (2) and the key is changed in color. There is a rest for the right hand at the reproduction time T2 as well, so that the right hand is displayed in a state where the index finger (2) that will press a key at the next key pressing time (reproduction time T4) is indicated with the key pressing preparation mark Q (in preparation for key pressing).

In the fingering image at the reproduction time T3 in FIG. 26C, a time of key pressing with the left hand is shown, and there is no musical sound as a key pressing target at a current reproduction position, and neither of the hands presses a key. At this time, a hand including a finger that will press a key at the next key pressing time (reproduction time T4) is drawn foremost, so that the right hand that will press a key next is drawn foremost.

That is, the middle finger (3) is in preparation for key pressing at the reproduction time T7 in the fingering image for the left hand, and the index finger (2) is in preparation for key pressing at the reproduction time T4 in the fingering image for the right hand, and the right hand including a finger that will press a key at the next key pressing time (reproduction time T4) is displayed foremost.

In the fingering image at the reproduction time T4 in FIG. 26D, a time of key pressing with the right hand is shown, so that the right hand is drawn foremost. In the fingering image for the right hand, the key of "D#" is pressed with the index finger (2), and the key is changed in color. There is a rest for the left hand at the reproduction time T4, so that the left hand is displayed in a state where the middle finger (3) that will press a key at the next key pressing time (reproduction time T7) is indicated with the key pressing preparation mark Q.

In the fingering image at the reproduction time T5 in FIG. 26E, a time of key pressing with the right hand is shown, so that the right hand is displayed foremost. In the fingering image for the right hand, the key of "E" is pressed with the middle finger (3), and the key is changed in color. There is a rest for the left hand at the reproduction time T5 as well, so that the left hand is displayed in a state where the middle finger (3) that will press a key at the next key pressing time (reproduction time T7) is indicated with the key pressing preparation mark Q.

In the fingering image at the reproduction time T6 in FIG. 26F, a time of key releasing of the right hand is shown, and there is no musical sound as a key pressing target at a current reproduction position and neither of the hands presses a key. At this time, a hand including a finger that will press a key at the next key pressing time (reproduction time T7) is drawn foremost, so that the left hand that will press a key next is drawn foremost. That is, in the fingering image for the left hand, the middle finger (3) is in preparation for key pressing at the reproduction time T7.

In the fingering image at the reproduction time T7 in FIG. 26G, a time of key pressing with the left hand is shown, so that the left hand is drawn foremost. In the fingering image for the left hand, "D#" is pressed with the middle finger (3), and the key is changed in color.

In the fingering image at the reproduction time T8 in FIG. 26H, a time of key pressing with the left hand is shown, so that the left hand is drawn foremost. In the fingering image for the left hand, the key of "E" is pressed with the index finger (2), and the key is changed in color.

Next, a case where the left hand and the right hand simultaneously press keys is described. In such a case, when the fingering images for the left hand and the right hand overlap each other, and the left hand and the right hand simultaneously press keys, processing of drawing a hand with the higher difficulty level foremost is performed.

Figure 27:
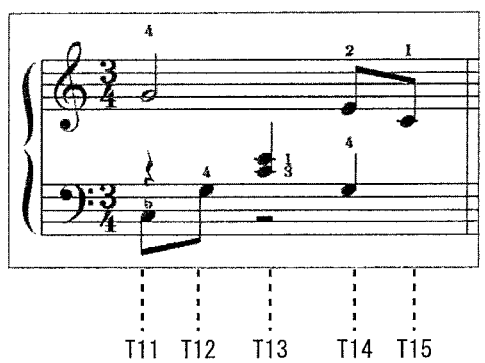
FIG. 27 shows an example of a musical score including a part in which the left hand and the right hand simultaneously press keys.

For example, in the case of the musical score shown in FIG. 27, the key of "C" is pressed with the little finger (5) of the left hand and the key of "G" is pressed with the ring finger (4) of the right hand (reproduction time T11), the key of "G" is pressed with the ring finger (4) of the left hand (reproduction time T12), the key of "C" and the key of "E" are simultaneously pressed with the middle finger (3) and the thumb (1) of the left hand, respectively (reproduction time T13), the key of "G" and the key of "E" are simultaneously pressed with the ring finger (4) of the left hand and the index finger (2) of the right hand, respectively (reproduction time T14), and the key of "C" is pressed with the thumb (1) of the right hand (reproduction time T15).

In this musical score, when generating fingering images for the left hand and the right hand based on fingering position information corresponding to a reproduction time in a musical piece reproduction, in a case where the fingering images for the left hand and the right hand overlap, among musical sounds as key pressing targets at a current reproduction position described above, processing of drawing foremost a hand corresponding to a musical sound whose sound production starting time is the latest is performed. When there is no musical sound as a key pressing target at a current reproduction position, and neither of the hands presses a key, processing of drawing foremost a hand including a finger that will press a key next is performed, and in addition, when the left hand and the right hand simultaneously press keys, processing of drawing foremost a hand with the higher difficulty level is performed.

Therefore, as fingering images for the left hand and the right hand at the reproduction time T, fingering images in which the left hand and the right hand overlap are drawn in chronological order (reproduction times T11 to T15) as shown in order in FIG. 28A to FIG. 28E.

At the time of key pressing, an under-key-pressing mark P is displayed at a corresponding fingertip, and the pressed key portion is changed in color (hatched portion).

Figure 28A:
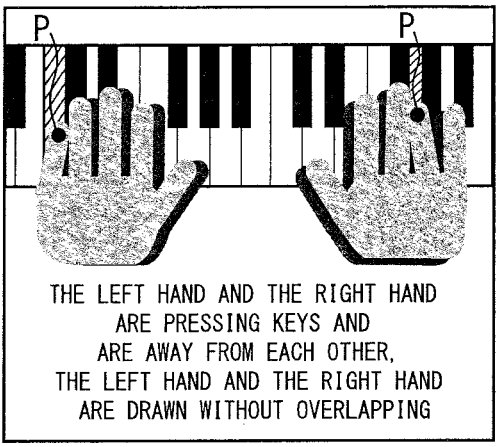
FIG. 28A is one of the image views chronologically showing fingering image examples to be displayed according to the musical score shown in FIG. 27.

In the fingering image at the reproduction time T11 in FIG. 28A, the left hand and the right hand are pressing keys and are away from each other, so that the left hand and the right hand are drawn without overlapping. In the fingering image for the left hand, the key of "C" is pressed with the little finger (5) and is changed in color. In the fingering image for the right hand, the key of "G" is pressed with the ring finger (4) and changed in color.

Figure 28B:
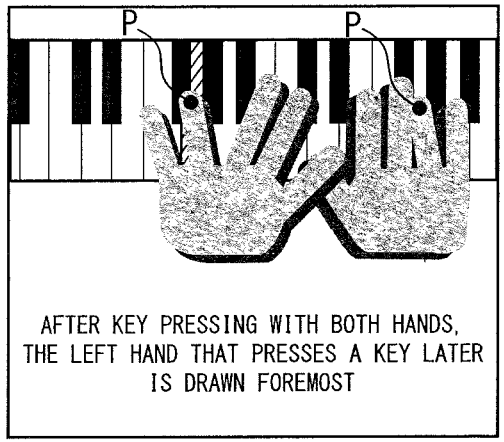
FIG. 28B is one of the image views chronologically showing fingering image examples to be displayed according to the musical score shown in FIG. 27.

In the fingering image at the reproduction time T12 in FIG. 28B, after key pressing with both hands at the reproduction time T11, the left hand that is pressing a key (the left hand that presses a key later) is drawn foremost. In the fingering image for the left hand, the key of "G" is pressed with the ring finger (4) and changed in color. In the fingering image for the right hand, the ring finger (4) that pressed the key at the reproduction time T11 is provided with an under-key-pressing mark P.

Figure 28C:
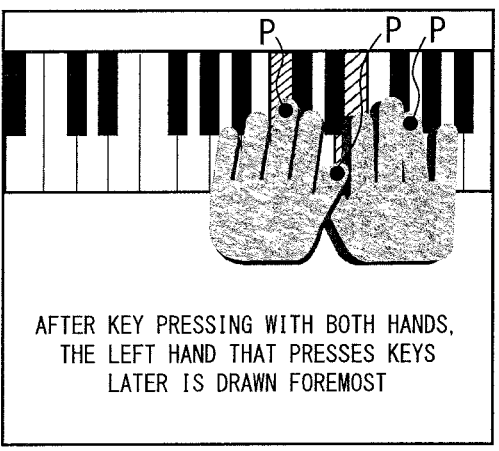
FIG 28C is one of the image views chronologically showing fingering image examples to be displayed according to the musical score shown in FIG. 27.

In the fingering image at the reproduction time T13 in FIG. 28C, after key pressing with both hands at the reproduction time T11, the left hand that is pressing keys (the left hand that presses keys later) is drawn foremost. In the fingering image for the left hand, the keys of "C" and "E" of a chord are pressed with the index finger (2) and the thumb (1) and changed in color. In the fingering image for the right hand, the ring finger (4) that pressed a key at the reproduction time T11 is provided with an under-key-pressing mark P.

Figure 28D:
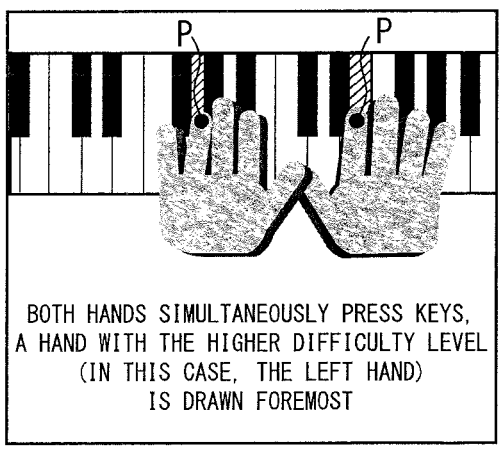
FIG. 28D is one of the image views chronologically showing fingering image examples to be displayed according to the musical score shown in FIG. 27.

In the fingering image at the reproduction time T14 in FIG. 28D, both hands simultaneously press keys. In this case, a hand with the higher difficulty level is drawn foremost, and in this example, the left hand is drawn foremost. In the fingering image for the left hand, the key of "G" is pressed with the ring finger (4) and changed in color. In the fingering image for the right hand, the key of "E" is pressed with the index finger (2) and changed in color.

Figure 28E:
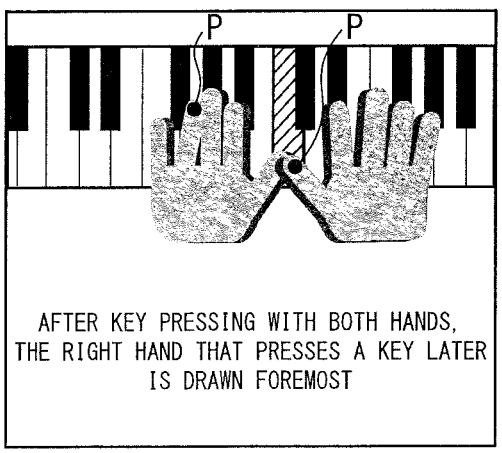
FIG. 28E is one of the image views chronologically showing fingering image examples to be displayed according to the musical score shown in FIG. 27.

In the fingering image at the reproduction time T15 in FIG. 28E, after key pressing with both hands at the reproduction time T14, the right hand that is pressing a key (the right hand that presses a key later) is drawn foremost. In the fingering image for the right hand, the key of "C" is pressed with the thumb (1) and changed in color. In the fingering image for the left hand, the ring finger (4) that pressed a key at the reproduction time T14 is provided with an under-key-pressing mark P.

When the fingering images for the left hand and the right hand overlap, the hand to be drawn foremost is drawn with lower transmissivity than that of the other hand, and accordingly, while the fingering image drawn foremost is made easily viewable, the fingering image for the back hand can also be checked at the same time.

According to the example described above, in the case where the fingering images for the left hand and right hand overlap, the fingering image to be drawn foremost is, if there are musical sounds as key pressing targets at a current reproduction position, a fingering image for a hand corresponding to a musical sound whose sound production starting time is the latest among the musical sounds, and is a fingering image for a hand including a finger that will press a key next when there is no musical sound as a key pressing target at a current reproduction position and neither of the hands presses a key.

In the fingering image in the case where the fingering images for the left hand and the right hand overlap, when the left hand and the right hand simultaneously press keys, a hand with the higher difficulty level is drawn foremost.

Next, in the fingering position information generation unit 14 and the fingering image generation unit 15 in FIG. 1, steps of generating fingering images for the left and right hands are described with reference to the flowchart in FIG. 29.

In the fingering display device, by the stored fingering display program, fingering position information are generated based on key pressing information at a reproduction time, and based on these fingering position information, fingering images for the left hand and the right hand are generated and drawn on the display device 18. The key pressing information also includes information on the sound volume.

First, keyboard information and information necessary for generation of fingering images for both hands (the left hand and the right hand) to be drawn on the keyboard, such as information on shapes of the respective fingers and the back of the hand, including a relative length of the back of the hand with respect to a keyboard width, and relative positions of the respective fingers from the back of the hand, note numbers, key pressing time periods, and sound volume values, etc., are read (Step 241).

Next, a keyboard is drawn from the keyboard information read in Step 241 (Step 242).

Whether the reproduction time is during key pressing is determined (Step 243). When it is during key pressing, whether key pressing is simultaneous key pressing with both hands is determined (Step 244).

When it is not during simultaneous key pressing with both hands, whether last key pressing was performed with the left hand is determined (Step 245).

In the case where last key pressing was performed with the left hand, a fingering image for the right hand is drawn (Step 246), and over this image, a fingering image for the left hand is drawn (Step 247), and a fingering image in which the left hand is disposed foremost is displayed on the screen (Step 250).

In the case where last key pressing was performed with the right hand, a fingering image for the left hand is drawn (Step 248), and over this image, a fingering image for the right hand is drawn (Step 249), and a fingering image in which the right hand is disposed foremost is displayed on the screen (Step 250).

When the reproduction time is not during key pressing in Step 243, whether next key pressing will be performed with the left hand is determined (Step 251).

When next key pressing will be performed with the left hand, a fingering image for the right hand is drawn (Step 252), and over this image, a fingering image for the left hand is drawn (Step 253), and a fingering image in which the left hand is disposed foremost is displayed on the screen (Step 250).

When next key pressing will be performed with the right hand, a fingering image for the left hand is drawn (Step 254), and over this image, a fingering image for the right hand is drawn (Step 255), and a fingering image in which the right hand is disposed foremost is displayed on the screen (Step 250).

When both hands are simultaneously pressing keys in Step 244, the difficulty levels of the left hand operation and the right hand operation are compared, and whether the difficulty level of the left hand is higher is determined (Step 261).

Whether the movement is a forward/rearward movement, and a note value and sound frequency, etc., whether the difficulty level is high is determined, by considering whether the hand is the right or left hand, a key pressing position, key pressing finger movement speed and distance for each time, and depending on whether the standards are met. It is also possible to scan the entire musical piece when starting to play it, and to detect a part(s) with a high difficulty level set depending on the musical piece.

When the difficulty level of the left hand is higher, a fingering image for the right hand is drawn (Step 262), and over this image, a fingering image for the left hand is drawn (Step 263), and a fingering image in which the left hand is disposed foremost is displayed on the screen (Step 250).

When the difficulty level of the right hand is higher, a fingering image for the left hand is drawn (Step 264), and over this image, a fingering image for the right hand is drawn (Step 265), and a fingering image in which the right hand is disposed foremost is displayed on the screen (Step 250).

According to the above-described fingering display program, when drawing fingering images for the left hand and the right hand, even in the case where the left hand and the right hand approach or cross each other, among musical sounds as key pressing targets at a current reproduction position, a hand corresponding to a musical sound whose sound production starting time is the latest can be displayed foremost, and when there is no musical sound as a key pressing target at a current reproduction position and neither of the hands presses a key, a hand including a finger that will press a key next can be displayed foremost.

As a result, by displaying foremost information on a key that should be pressed last, being information that a practicing person wants to know the most (a hand shape and a position of the back of the hand, a finger that should press a key, and a position of the key to be pressed), these pieces of information can be displayed without being hidden by or obstructed by a hand or finger that previously pressed a key.

In the case where fingering images for the left hand and the right hand overlap, when the left hand and the right hand simultaneously press keys, by displaying a hand with the higher difficulty level foremost, information on the fingers of the hand with the higher difficulty level, being more important for a practicing person, can be prioritized.

In addition, in the case where fingering images for the left hand and the right hand overlap, a hand to be drawn foremost is drawn with lower transmissivity than that of the other hand, and accordingly, while the fingering image drawn foremost is made easily viewable, the fingering image for the back hand can also be checked at the same time.

REFERENCE SIGNS LIST

11 ... Musical sound/finger number information storage unit
12 ... Key pressing information generation unit
13 ... Key pressing information storage unit
14 ... Fingering position information generation unit
15 ... Fingering image generation unit
16 ... Musical score image generation unit
17 ... Image information storage unit
18 ... Display device
21 ... Reproduction information generation unit
22 ... Reproduction information storage unit
23 ... Sound generation unit
24 ... Sound reproduction unit
25 ... Sound output device
T1 ... Time corresponding to just-before-key-releasing time before and closest to reproduction time T (time a predetermined time before key releasing time, etc.)
T2 ... Key pressing time after and closest to reproduction time T when T is key releasing time, or key pressing time before and closest to reproduction time T when T is key pressing time
T3 ... Key releasing time after and closest to T2 (time corresponding to time of key releasing next to key pressing at T2)
T4 ... Key pressing time after and closest to T2 (time of key pressing next to key pressing at T2)
FK1 ... Key pressing information at time T1 (key pressing flags for respective fingers, key numbers)
FK2 ... Key pressing information at time T2 (key pressing flags for respective fingers, key numbers)
FK4 ... Key pressing information at time T4 (key pressing flags for respective fingers, key numbers)
FK12 ... Key pressing information obtained by synthesizing key pressing information FK1 and key pressing information FK2 (key pressing flags for respective fingers, key numbers)
FK24 ... Key pressing information obtained by synthesizing key pressing information FK2 and key pressing information FK4 (key pressing flags for respective fingers, key numbers)
Ps ... Fingering position information at start point time of fingering (base coordinates and tip coordinates of respective fingers, central coordinates of the back of the hand)
Pe ... Fingering position information at end point time of fingering (base coordinates and tip coordinates of respective fingers, central coordinates of the back of the hand)
Pm ... Fingering position information at reproduction time T (base coordinates and tip coordinates of respective fingers, central coordinates of the back of the hand)
A ... Key releasing fingering image
B ... Key pressing fingering image
C ... Fingering shadow image
P ... Under-key-pressing mark
Q ... Key pressing preparation mark
X ... Fingering image with offset image

The invention claimed is:

1. A fingering display program to perform fingering display on a screen by drawing a fingering moving image of playing a musical instrument in a musical piece reproduction based on playing information including respective musical sounds of a musical piece and corresponding finger numbers, wherein when generating a fingering drawing based on fingering position information corresponding to a reproduction time in the musical piece reproduction,
the fingering display program makes a computer execute:
generating the fingering position information based on single key pressing information corresponding to a single time among times including at least a time before the reproduction time and a time after the reproduction time, and synthetic key pressing information obtained by synthesizing respective key pressing information at a plurality of different times,
wherein the fingering position information includes at least a center position of the back of a hand and tip positions of the respective fingers.

2. The fingering display program according to claim 1, wherein
the plurality of different times includes a time that is a key pressing time after and closest to the reproduction time when the reproduction time is a key releasing time, and is a key pressing time before and closest to the reproduction time when the reproduction time is a key pressing time.

3. The fingering display program according to claim 2, wherein
the plurality of different times includes:
a time just before changing to key pressing information at the time; and
a time just after changing from key pressing information at the time.

4. The fingering display program according to claim 3, wherein
the synthetic key pressing information includes
key pressing information obtained by synthesizing key pressing information at a time before the reproduction time and key pressing information at a time after the reproduction time.

5. The fingering display program according to claim 1, wherein the key pressing information is key pressing positions (keyboard positions) and key pressing states (whether key pressing or key releasing) of the respective fingers at a corresponding time.

6. The fingering display program according to claim 1, wherein
the fingering position information includes interpolated coordinates of fingers calculated by interpolating:
coordinates of the tip positions of the respective fingers at a start point time Ts of fingering at a time before the reproduction time; and
coordinates of the tip positions of the respective fingers at an end point time Te of fingering at a time after the reproduction time,
according to elapse of time from the time Ts to the time Te.

7. A fingering display device that performs fingering display on a screen by drawing a fingering moving image of playing a musical instrument at a reproduction time in a musical piece reproduction based on key pressing information of a musical piece, comprising:
a musical sound/finger number information storage unit storing fingering information for performing the fingering display;
a key pressing information generation unit that generates from the fingering information respective key pressing information at a plurality of different times including a time before the reproduction time and a time after the reproduction time;

a fingering position information generation unit that generates fingering position information based on synthetic key pressing information obtained by synthesizing the respective key pressing information;
a fingering image generation unit that generates a fingering image from the fingering position information, and
a display device that displays a fingering image generated in the fingering image generation unit,
wherein:
the fingering position information is fingering position information calculated by interpolating:
fingering position information at a start point time Ts of fingering at a time before the reproduction time; and
fingering position information at an end point time Te of fingering at a time after the reproduction time, according to elapse of time from the time Ts to the time Te.

8. A fingering display program to perform fingering display on a screen by drawing a fingering moving image of playing a musical instrument in a musical piece reproduction based on playing information including respective musical sounds of a musical piece and corresponding finger numbers, wherein
when generating a fingering drawing based on fingering position information corresponding to a reproduction time in the musical piece reproduction,
the fingering display program makes a computer execute: setting,
a time being a key pressing time after and closest to the reproduction time from a key releasing time when key pressing changes to key releasing at the reproduction time, and
a time just before changing to key pressing information at the time; and
generating fingering position information (Pm) so that shifting to a fingering position corresponding to the key pressing information at the time (T2) completes before the reproduction time (T) elapses a predetermined time from the time (T1), when a time period from the time (T1) to the time (T2) is longer than a desired time.

9. The fingering display program according to claim 8, wherein the fingering display program generates the fingering position information based on single key pressing information corresponding to a single time among times including at least a time before the reproduction time and a time after the reproduction time, and synthetic key pressing information obtained by synthetizing respective key pressing information at a plurality of different times.

10. The fingering display program according to claim 9, wherein
the plurality of different times include:
a time just before changing to key pressing information at the time; and
a time just after changing from key pressing information at the time.

11. The fingering display program according to claim 10, wherein
the synthetic key pressing information includes:
key pressing information obtained by synthesizing key pressing information at the time and key pressing information at the time; and
key pressing information obtained by synthesizing key pressing information at the time and key pressing information at the time.

12. The fingering display program according to claim 8, wherein the key pressing information is key pressing positions (keyboard positions) and key pressing states (whether key pressing or key releasing) of the respective fingers at a corresponding time.

13. The fingering display program according to claim 8, wherein the fingering position information includes at least a center position of the back of a hand and tip positions of the respective fingers.

14. The fingering display program according to claim 8, wherein
the fingering position information is fingering position information calculated by interpolating:
fingering position information at a start point time of fingering at a time before the reproduction time; and
fingering position information at an end point time of fingering at a time after the reproduction time,
according to elapse of time from the time Ts to the time Te.

15. A fingering display program to perform fingering display on a screen by drawing a fingering moving image of playing a musical instrument in a musical piece reproduction based on key pressing information of a musical piece, wherein
when generating a fingering drawing based on fingering position information corresponding to a reproduction time in the musical piece reproduction,
the fingering display program makes a computer execute functions of:
preparing a key pressing fingering image at the time of key pressing at the reproduction time, a key releasing fingering image at the time of key releasing just before the key pressing, and
a dark-colored fingering shadow image;
simultaneously displaying either the key pressing fingering image and the fingering shadow image or the key releasing fingering image and the fingering shadow image; and
displaying the key releasing fingering image so as to increase an offset according to a sound volume at the time of the next key pressing with respect to the fingering shadow image.

16. The fingering display program according to claim 15, wherein at the time of chord key pressing, the key pressing fingering image and the key releasing fingering image are generated as images having the same shape.

17. The fingering display program according to claim 15, wherein at the time of single note key pressing, the key pressing fingering image and the key releasing fingering image are generated as images that are different only in key pressing finger.

18. The fingering display program according to claim 15, wherein the key pressing fingering image and the key releasing fingering image are light-colored.

19. The fingering display program according to claim 15, wherein an offset position of the key pressing fingering image or the key releasing fingering image with respect to the fingering shadow image is set to the upper right side for the right hand, and to the upper left side for the left hand.

20. The fingering display program according to claim 15, wherein a key pressing preparation mark is displayed near the tip of a finger that will press a key next in the key releasing fingering image.

21. The fingering display program according to claim 15, wherein an under-key-pressing mark is displayed near the tip of a finger that is pressing a key in the key pressing fingering image.

22. The fingering display program according to claim 15, wherein a color tone of a finger that is pressing a key in the key pressing fingering image is displayed to be darker than that of a finger releasing a key in the key pressing fingering image.

23. The fingering display program according to claim 15, wherein the offset corresponding to a sound volume at the time of key pressing is gradually changed according to a remaining time before key pressing.

24. A fingering display device that performs fingering display on a screen by drawing a fingering moving image of playing a musical instrument in a musical piece reproduction based on key pressing information of a musical piece, comprising:
 a musical sound/finger number information storage unit storing fingering information for performing fingering display;
 a key pressing information generation unit that generates key pressing information from the fingering information;
 a fingering position information generation unit that generates fingering position information from the key pressing information;
 a fingering image generation unit that, when generating a fingering image at a reproduction time in the musical piece reproduction from the fingering position information, prepares a key pressing fingering image at the time of key pressing at the reproduction time, a key releasing fingering image at the time of key releasing just before the key pressing, and a dark-colored fingering shadow image, simultaneously displays either the key pressing fingering image and the fingering shadow image or the key releasing fingering image and the fingering shadow image, and generates a fingering image with an offset image in which the key releasing fingering image is offset with respect to the fingering shadow image and displayed so that an offset increases according to a sound volume at the next key pressing time, and the offset is gradually changed according to a remaining time before the next key pressing; and
 a display device that displays fingering images generated in the fingering image generation unit.

25. A fingering display program to perform fingering display on a screen by drawing a fingering moving image of playing a musical instrument in a musical piece reproduction based on key pressing information of a musical piece, wherein
 when generating fingering images for the left hand and the right hand based on fingering position information corresponding to a reproduction time in the musical piece reproduction,
 the fingering display program makes a computer execute functions of:
 in a case where fingering images for the left hand and the right hand overlap, drawing foremost a hand corresponding to a musical sound whose sound production starting time is the latest among musical sounds as key pressing targets at a current reproduction position; and
 in a case where there is no musical sound as a key pressing target at a current reproduction position and neither of the hands presses a key, drawing foremost a hand including a finger that will press a key next.

26. The fingering display program according to claim 25, wherein in a case where fingering images for the left hand and the right hand overlap, when the left hand and the right hand simultaneously press keys, the fingering display program makes a computer execute a function of drawing a hand with the higher difficulty level foremost.

27. The fingering display program according to claim 25, wherein image drawing is performed by setting transmissivity of a hand to be drawn foremost to be higher than that of the other hand.

* * * * *